(12) United States Patent
Mukai et al.

(10) Patent No.: US 11,955,637 B2
(45) Date of Patent: Apr. 9, 2024

(54) ELECTRODE FOR NON-AQUEOUS ELECTROLYTE BATTERY AND NON-AQUEOUS ELECTROLYTE BATTERY

(71) Applicants: ATTACCATO Limited Liability Company, Izumi (JP); ADEKA Corporation, Tokyo (JP)

(72) Inventors: Takashi Mukai, Izumi (JP); Naoto Yamashita, Settu (JP); Yuta Ikeuchi, Izumi (JP); Taichi Sakamoto, Kishiwada (JP); Kenji Kakiage, Tokyo (JP); Hiroyuki Osada, Tokyo (JP); Yohei Aoyama, Tokyo (JP)

(73) Assignees: ATTACCATO LIMITED LIABILITY COMPANY, Izumi (JP); ADEKA CORPORATION, Tokyo (JP)

( * ) Notice: Subject to any disclaimer, the term of this patent is extended or adjusted under 35 U.S.C. 154(b) by 569 days.

(21) Appl. No.: 17/295,617

(22) PCT Filed: Nov. 22, 2019

(86) PCT No.: PCT/JP2019/045850
§ 371 (c)(1),
(2) Date: May 20, 2021

(87) PCT Pub. No.: WO2020/105735
PCT Pub. Date: May 28, 2020

(65) Prior Publication Data
US 2022/0020989 A1 Jan. 20, 2022

(30) Foreign Application Priority Data
Nov. 23, 2018 (JP) .................................. 2018-219788

(51) Int. Cl.
*H01M 4/00* (2006.01)
*H01M 4/04* (2006.01)
(Continued)

(52) U.S. Cl.
CPC ....... *H01M 4/5825* (2013.01); *H01M 4/0404* (2013.01); *H01M 4/382* (2013.01);
(Continued)

(58) Field of Classification Search
CPC ............ H01M 4/58; H01M 4/62; H01M 4/66; H01M 4/38; H01M 4/46; H01M 4/40
See application file for complete search history.

(56) References Cited

U.S. PATENT DOCUMENTS

| | | |
|---|---|---|
| 4,833,048 A | 5/1989 | Dejonghe et al. |
| 2019/0326601 A1 | 10/2019 | Sakamoto et al. |

FOREIGN PATENT DOCUMENTS

| | | |
|---|---|---|
| JP | 2002-154815 A | 5/2002 |
| JP | 2002-164084 A | 6/2002 |

(Continued)

OTHER PUBLICATIONS

Campbell V et al, Coated Sulfur Particle Electrode and Method, Aug. 2016, See the Abstract. (Year: 2016).*
(Continued)

*Primary Examiner* — Cynthia H Kelly
*Assistant Examiner* — Monique M Wills
(74) *Attorney, Agent, or Firm* — WHDA, LLP

(57) ABSTRACT

To provide an electrode for non-aqueous electrolyte batteries, which traps hydrogen sulfide gas, generated from the inside thereof for some reason, in the electrode, and suppresses the outflow of hydrogen sulfide gas to the outside of the battery. An electrode for lithium ion batteries includes a coating material which contains a silanol group and is present on at least a surface of an active material layer. The active material layer contains a sulfur-based material and a resin-based binder. The sulfur-based material is an active material capable of alloying with lithium metal or an active material capable of occluding lithium ions. The coating
(Continued)

Example of cross section of electrode coated with hydrogen sulfide gas trapping material material containing the silanol group is a silicate having a siloxane bond or a silica fine particle aggregate having a siloxane bond as a component.

28 Claims, 6 Drawing Sheets

(51) Int. Cl.
   *H01M 4/38* (2006.01)
   *H01M 4/46* (2006.01)
   *H01M 4/58* (2010.01)
   *H01M 4/62* (2006.01)
   *H01M 4/66* (2006.01)

(52) U.S. Cl.
   CPC ........... *H01M 4/466* (2013.01); *H01M 4/622* (2013.01); *H01M 4/662* (2013.01)

(56) References Cited

FOREIGN PATENT DOCUMENTS

| JP | 2003-123758 A | 4/2003 | |
|---|---|---|---|
| JP | 2008-103245 A | 5/2008 | |
| JP | 2013-196878 A | 9/2013 | |
| JP | 2015-088437 A | 5/2015 | |
| JP | 2018-63912 A | 4/2018 | |
| JP | 2018-065980 A | 4/2018 | |
| JP | 2018-85276 A | 5/2018 | |
| JP | 2018-085291 A | 5/2018 | |
| JP | 2018174136 A | * 11/2018 | |
| WO | 2010/044437 A1 | 4/2010 | |
| WO | 2015/030053 A1 | 3/2015 | |
| WO | WO-2016130980 A1 | * 8/2016 | .......... H01M 10/052 |

OTHER PUBLICATIONS

Aoyama et al., Electrode Used In Lithium Ion Secondary Battery, Comprises Mixture Comprising Fibrous Sulfur-Modified Polyacrylonitrile Having Preset Aspect Ratio, And Particulate Sulfur-Modified Polyacrylonitrile As Active Material, Nov. 2018, See the Abstract. (Year: 2018).*
International Search Report dated Jan. 28, 2020, issued in counterpart application No. PCT/JP2019/045850 (2 pages).
Miyuki et al., "The Latest Technological Trend of Rare Metal-Free Secondary Batteries: Research and development of organic sulfur-based positive electrodes", CMC Publishing Co., Ltd., 2013, pp. 81-101, w/English translation, cited in Specification (26 pages).
Sakai et al., "Research and development of heat-resistant, high-power Li-ion batteries", Battery Technology, 2013, 25, pp. 65-74, w/English translation, cited in Specification (18 pages).
Kubo, "Development of sulfur-based positive electrode material using rubber material as precursor and battery characteristics", Industrial Material, 2015, 63(12), pp. 35-38, w/English translation, cited in Specification (9 pages).
Hayashi et al., "All-solid-state Li/S batteries with highly conductive glass-ceramic electrolytes", Electrochemistry Communications, 2003, 5(8), pp. 701-705, cited in Specification (5 pages).
Sakamoto et al., "Measurement / analytical data collection for lithium secondary battery components: Lithium doping method and characterization of alloy negative electrodes", Technical Information Institute Co., Ltd., 2012, chapter 3, section 30, pp. 200-205, w/English translation, cited in Specification (10 pages).

* cited by examiner

ELECTRODE FOR NON-AQUEOUS ELECTROLYTE BATTERY AND NON-AQUEOUS ELECTROLYTE BATTERY

TECHNICAL FIELD

The present invention relates to an electrode for non-aqueous electrolyte batteries, which traps hydrogen sulfide gas generated from the inside thereof for some reason, and suppresses the outflow of hydrogen sulfide gas to the outside thereof, and relates to a non-aqueous electrolyte battery.

BACKGROUND TECHNOLOGY

In recent years, the field of use of secondary batteries with high energy density is expanding from power sources for portable devices such as smartphones and tablet terminals to electric vehicles (hybrid vehicles (HEV), plug-in hybrid vehicles (PHEV), electric vehicles (EV)), and for power storage. In particular, automobile manufacturers are actively developing and commercializing electric vehicles and the like in order to comply with environmental regulations aimed at reducing automobile exhaust gas and carbon dioxide gas worldwide. The annual production of automobile batteries in 2017 is estimated to be about 50 GWh, and is expected to reach about 150 GWh (about three times the current annual production for mobile devices) around 2020.

In a field such as power storage, since the amount of power generation fluctuates depending on the environment, a large power storage system is required. Recently, the cost of power generation from renewable energy such as wind power and solar power has been reduced to less than half that of coal-fired power generation, accounting for one-fifth of the world's share of power generation in 2016. Considering future widespread use, battery production will be required to be more than five times the current level.

As described above, the secondary battery is indispensable for energy saving, introduction of new energy, clean automobiles, etc., and is positioned as an important key device from the viewpoint of economic growth.

Typical general-purpose secondary batteries include lead batteries, nickel-cadmium (Ni—Cd) batteries, nickel-hydrogen (Ni-MH) batteries, and lithium-ion batteries, but use of lithium ion batteries that are non-aqueous electrolyte secondary batteries is increasing due to their features of being small-size, lightweight, high-voltage, and free from memory effect. It should be noted that non-aqueous electrolyte batteries include also sodium ion batteries, potassium ion batteries, magnesium ion batteries, and calcium ion batteries, etc. The lithium ion battery is constituted by a positive electrode, a negative electrode, a separator, an electrolytic solution or an electrolyte, and an outer package (also referred to as a battery jar, a storage case, or a casing).

An electrode such as the positive electrode and the negative electrode is constituted by an active material, a conductive assistant, a resin-based binder, and a current collector. In general, the electrode is manufactured by mixing the active material, the conductive assistant, and the resin-based binder with a solvent to form slurry, coating the current collector with the slurry, drying the slurry, and then rolling the dried slurry with a roll press, etc.

The electrolytic solution is a non-aqueous electrolyte, and is mainly used in a commercially available lithium ion battery by dissolving lithium hexafluorophosphate (LiPF6) in a carbonate-based organic solvent.

Positive electrode active materials used in commercially available batteries include lithium cobalt oxide ($LiCoO_2$), ternary materials (Li (Ni, Co, Mn) $O_2$), NCA materials (Li (Ni, Co, Al) $O_2$), etc. However, most of them are rare metals such as cobalt (Co) and nickel (Ni), and oxides containing elements whose production areas are unevenly distributed. For rare metals and resources whose production areas are unevenly distributed, there is a risk of fluctuations in market prices and difficulty in obtaining them, so it is necessary to develop batteries made of materials that are inexpensive and easy to obtain, and whose production areas are not unevenly distributed.

Further, although these oxide-based positive electrode active materials have a high discharge voltage of 3 V (vs. Li/Li+) or more, the effective electric capacity is about 140 mAh/g to 220 mAh/g, therefore, it is desired that the capacity is further increased.

Increasing the battery capacity is an issue that continues to be required for all uses, but as the electric capacity of a battery increases, the risk of thermal runaway increases. In most commercially available lithium-ion batteries, when charged, lithium ions in the positive electrode oxide move to between the layers of graphite, resulting in intercalation. When the battery is heated in this state, the positive electrode active material thermally decomposes at about 200° C., and releases oxygen, which may cause the electrolyte to burn violently.

By the way, sulfur is a low cost material and abundant in resources, but about 70% of the world production of sulfur is a byproduct of desulfurization during petroleum refining. Sulfur is known to have many allotropes and crystal polymorphisms, but the melting point (mp.) is about 113° C. for α-sulfur (rhombic), about 120° C. for β-sulfur (monoclinic), and about 107° C. for γ-sulfur (monoclinic). The boiling point (bp.) is about 440° C., respectively. Sulfur has a wide range of uses as a raw material for sulfate chemical factories, fertilizers, rubber, explosives, etc., but currently, the amount of sulfur produced is larger than the amount of sulfur consumed. Therefore, in recent years, the problem of final disposal of excess byproduct of sulfur has become more serious.

Therefore, while various uses are being developed, a technique using sulfur as an active material of an electrode (positive electrode or negative electrode) is drawing attention. Sulfur has a discharge voltage of about 2 V (vs. Li/Li+), which is lower than that of transition metal oxides, but has a theoretical electric capacity of 1672 mAh/g, which is very high. In addition, since oxygen is not released by thermal decomposition, sulfur is attracting attention as a material with excellent safety.

However, sulfur has a larger electrical resistivity of $2.0 \times 10^{15}$ Ωm (20° C.) than soda glass ($10^{9-11}$ Ωm (20° C.)), polyester ($10^{12-14}$ Ωm (20° C.)), vinyl chloride ($10^{13}$ Ωm (20° C.)) and natural rubber ($10^{14}$ Ωm (20° C.)), etc., and is known to have a high insulating property.

There is a method of improving the electronic conductivity of a material having poor electronic conductivity (high electrical resistivity) by thermally decomposing a carbon precursor (organic substances, hydrocarbon gas, etc.) and compounding the material with carbon, however, since the boiling point of sulfur is lower than the temperature required for thermally decomposing the carbon precursor, the application of this method is extremely difficult.

Further, in the electrode using sulfur, lithium polysulfide ($Li_2S_{2-8}$) and a low molecular weight sulfur compound are produced by a lithiated reaction (a discharging reaction when used as a positive electrode and a charging reaction when used as a negative electrode), which elute into a carbonate-based solvent in the electrolytic solution and practical cycle characteristics cannot be obtained. Since the amount of lithium polysulfide eluted into the electrolytic solution tends to increase as the temperature rises, it becomes more difficult to operate the battery at a high temperature.

Therefore, in order to improve the conductivity and suppress the elution of lithium polysulfide and the like, sulfur and carbon, organic substances and the like are combined and modified. For example, as a method for imparting conductivity and suppressing elution of lithium polysulfide, an organic disulfite compound (for example, Patent Literature 1), a sulfide polymer (for example, Patent Literature 2), and polycarbon sulfide (for example, Patent Literature 3, Patent Literature 4), sulfur-modified polyacrylonitrile (for example, Patent Literature 5, Non-Patent Literature 1, Non-Patent Literature 2), sulfur-modified rubber (for example, Patent Literature 6, Non-Patent Literature 3) and the like have been proposed.

Non-Patent Literature 1 shows the thermogravimetric (TG) measurement results of elemental sulfur and sulfur-modified polyacrytonitrile (S-PAN). Elemental sulfur starts to lose weight from around 200° C. and shows a rapid weight loss due to evaporation by around 320° C., but S-PAN shows only about 20% weight loss at 600° C. From this result, it can be seen that S-PAN has higher heat resistance than elemental sulfur.

In addition, in order to suppress the elution of lithium polysulfide, batteries using a polymer electrolyte (for example, Patent Literature 7), an ionic liquid (Patent Literature 8), and a solid electrolyte (for example, Patent Literature 9 and Non-Patent Literature 4) have been proposed. Until now, polymer electrolytes and solid electrolytes have been said to be inferior in ionic conductivity to electrolytic solutions and difficult to operate in room temperature or low temperature environments. However, recently, research and development of electrolyte materials have progressed, and several materials have been found that show high ionic conductivity.

The polymer electrolytes can be classified into intrinsic polymer electrolytes and gel polymer electrolytes. The intrinsic polymer electrolyte is an electrolyte composed of only a polymer electrolyte salt (supporting salt), and the gel polymer electrolyte is an electrolyte obtained by adding an electrolytic solution as a plasticizer to the intrinsic polymer electrolyte for immobilizing.

The ionic liquid is a salt that exists as a liquid at 150° C. or lower, through which an electric current can flow without dissolving the electrolyte salt, and is also called an ionic liquid, a low melting point molten salt, or the like. The ionic liquid can be roughly classified into pyridine-based ionic liquid, alicyclic amine-based ionic liquid and aliphatic amine-based ionic liquid depending on the type of cation.

As the solid electrolyte, sulfur-based solid electrolytes, oxide-based solid electrolytes, hydride-based solid electrolytes, etc., are known and most of them are amorphous (glass) or crystalline composed of alkali metal salts and inorganic derivatives. Since the counter anion does not move in this electrolyte, the transport number of the ion species responsible for electrical conduction (for example, lithium ion in a lithium ion battery and sodium ion in a sodium ion battery) is 1, side reactions are suppressed, and the battery utilization is improved. In addition, unlike conventional lithium-ion batteries that use electrolytes, organic solvents are not used, so ignition and leakage of gas and liquids will not occur. Therefore, it is expected that the batteries will have excellent safety.

However, a general solid electrolyte is a non-fluid powdery material and has a property of being highly reactive with moisture. In particular, a sulfur-based solid electrolyte containing sulfur as a main component generates hydrogen sulfide gas when it comes into contact with moisture. Hydrogen sulfide gas ($H_2S$) is a colorless flammable gas with a rotten egg odor. For the human body, it is a toxic gas that irritates the eyes, skin and mucous membranes.

When the hydrogen sulfide concentration in the air is 1 ppm or more, a faint odor is observed, and the odor is remarkable when the concentration is 3 ppm or more, and an extremely unpleasant odor is felt when the concentration is 5 ppm or more. And if it becomes 10 ppm or more, there is a risk of hydrogen sulfide poisoning. It is pointed out that the higher the concentration of hydrogen sulfide gas and the longer the exposure time, the greater the danger to life.

Therefore, in a battery containing sulfide inside the cell, when the battery is damaged, the sulfide may come into contact with the moisture in the air to generate hydrogen sulfide gas. Therefore, a technique for suppressing the generation of hydrogen sulfide gas as much as possible is required. As a countermeasure, a method of trapping and detoxifying hydrogen sulfide gas has been proposed.

For example, in Patent Literature 10, a sulfide-based secondary battery is proposed. The battery includes a sulfur compound that generates hydrogen sulfide gas by decomposition therein, and the outer periphery of the battery is covered with a substance that traps the hydrogen sulfide gas and makes it non-toxic.

If the sulfide-based material is not pre-doped before assembling the battery, the battery capacity will extremely decrease. Therefore, various pre-doping methods have been proposed to supplement lithium in advance.

For example, as described in Patent Literature 11 and Non-Patent Literature 5, there are known methods such as an electrochemical method, an alkali metal pasting method, and a mechanical method.

CITATION LIST

Patent Literature

PLT 1: U.S. Pat. No. 4,833,048 B
PLT 2: JP 2018-065980 A
PLT 3: JP 2002-154815 A
PLT 4: JP 2003-123758 A
PLT 5: WO 2010/044437
PLT 6: JP 2018-085291 A
PLT 7: JP 2002-164084 A
PLT 8: JP 2013-196878 A
PLT 9: WO 2015/030053
PLT 10: JP 2008-103245 A
PLT 11: JP 2015-088437 A

Non-Patent Literature

NPLT 1: MIYUKI Takuhiro, KOJIMA Toshikatsu, SAKAI Tetsuo: "The Latest Technological Trend of Rare Metal-Free Secondary Batteries", CMC Publishing Co., Ltd., pp. 81-101 (2013)
NPLT 2: SAKAI Tetsuo, MIYUKI Takuhiro, MUKAI Takashi: Battery Technology, 25, pp. 65-74 (2013)
NPLT 3: KUBO Tatsuya: Industrial Material, 63(12), pp. 35-38 (2015)
NPLT 4: Akitoshi Hayashi, Takamasa Ohtomo, Fuminori Mizuo, Kiyoharu Tadanaga, Masahiro Tatsumisago: Electrochemistry Communications, 5(8), pp. 701-705 (2003)

NPLT 5: SAKAMOTO Taichi, MIYUKI Takuhiro, SAKAI Tetsuo: "Measurement/analytical data collection for lithium secondary battery components", Technical Information Institute Co., LTD., chapter 3, section 30, pp. 200-205 (2012)

SUMMARY OF INVENTION

Technical Problem

The sulfur-based materials disclosed in PLTs 1 to 6 and NPLTs 1 to 3 can obtain excellent cycle characteristics as compared with electrodes using elemental sulfur by compounding or denaturing sulfur with carbon, organic substances, etc. The batteries disclosed in PLT 7 and PLT 8 have improved cycle characteristics as compared with batteries including an electrolytic solution by using an electrolyte in which lithium polysulfide is difficult to elute. However, although these documents have studied to improve the characteristics of electrodes and batteries, there is no assumption that a sulfide comes into contact with moisture in the air when the batteries are damaged.

In PLT 9, it is possible to trap hydrogen sulfide gas by covering the outer periphery of the battery cell with a substance that traps and detoxifies hydrogen sulfide gas. However, with the detoxifying substance covering the outer periphery of the battery cell, a volumetric energy density of the battery will significantly decrease.

By the way, for the temperature control of a battery, a method of exchanging heat with a gas or liquid through the outer portion of the battery (so-called air cooling method or water cooling method) is currently adopted. If the outer periphery of the battery cell is covered with a substance having poor heat conduction, the heat cannot be efficiently transferred to the battery. Naturally, as the thickness and porosity of the covering substance increase, the thermal conductivity of the battery will be lost. Since the stronger a substance has an intermolecular force, the easier heat transmitted in the substance, the heat conductivity increases in the order of gas, liquid, and solid.

In PLT 9, alkaline substances can be exemplified as detoxifying substances, and they can be used as aqueous solutions, slurries, gels, and powders. Among these, from the viewpoint of improving the heat exchange property of the battery, it can be said that powders have the highest thermal conductivity because the vibration of molecules is most easily transmitted in powders. However, voids are included in powders, so the thermal conductivity is low. Even if an alkaline substance and a resin are mixed and used as a molded sheet, voids are included, and the resin itself is a substance having a low thermal conductivity.

When this detoxifying substance is used as an electrode, a moisture-proof multilayer film composed of a metal foil layer for improving airtightness and a resin layer for keeping strength is required as the outer case of the battery. Therefore, it is not suitable for batteries with a hard case such as cylindrical batteries or square batteries.

Therefore, the inventors of the present application have considered an electrode in a battery for a non-aqueous electrolyte using a sulfur-based material, which suppresses the release of hydrogen sulfide gas, generated when the sulfur-based material comes into contact with moisture, out of the electrode without impairing the volumetric energy density and thermal conductivity of the battery.

Solution to Problem

In order to achieve the above object, an electrode for non-aqueous electrolyte batteries according to one aspect of the present invention (hereinafter referred to as "electrode of the present invention") includes a current collector, an active material layer, and a coating material; the coating material containing a silicate having a siloxane bond or a silica fine particle aggregate having a siloxane bond as a component; the silicate having the siloxane bond or the silica fine particle aggregate having the siloxane bond containing a silanol group and being present on at least a surface of the active material layer; and the active material layer containing a sulfur-based material and a resin-based binder.

In the electrode of the present invention, the sulfur-based material is preferably sulfur-modified polyacrylonitrile.

In the electrode of the present invention, it is preferable that the coating material is present in the active material layer.

In the electrode of the present invention, the coating material suppresses the release of hydrogen sulfide gas, generated in the active material layer, to the outside.

In the electrode of the present invention, it is preferable that the coating material blocks an outgassing path of hydrogen sulfide gas generated in the active material layer to the outside.

In the electrode of the present invention, it is preferable that the active material layer is a porous body having voids, the coating material does not fill all of the voids in the active material layer, and the voids are present in the active material layer.

In the electrode of the present invention, it is preferable that the active material layer is a porous body with voids, which has a porosity of 5% or more and 70% or less, and the coating material is coated on a surface of the voids.

In the electrode of the present invention, it is preferable that the coating material covering the active material layer has a thickness of 10 nm or more and 5000 nm or less.

In the electrode of the present invention, it is preferable that the silicate has an amorphous structure represented by a general formula $A_2O \cdot nSiO_2$, where A contains at least one kind of alkali metal element selected from Li, Na, K, Rb, and Cs, and n is 0.5 or more and 5.0 or less.

In the electrode of the present invention, it is preferable that aluminum or aluminum alloy is used for the current collector.

In the electrode of the present invention, it is preferable that the coating material further contains carbon.

In the electrode of the present invention, the resin-based binder contained in the active material layer is preferably a water-based binder.

In the electrode of the present invention, it is preferable that, when the electrode comes into contact with moisture, the coating material suppresses contact between the sulfur-based material and moisture, and traps hydrogen sulfide gas generated in the active material layer.

In the electrode of the present invention, it is preferable that the sulfur-based material is a solid material that generates hydrogen sulfide gas by decomposition.

In the electrode of the present invention, it is preferable that the sulfur-based material has a particle size of 0.1 μm or more and 20 μm or less in median diameter ($D_{50}$).

An electrode for a non-aqueous electrolyte battery of the present invention includes a current collector, an active material layer, and a coating material; the coating material containing a silicate having a siloxane bond or a silica fine particle aggregate having a siloxane bond as a component; the silicate having the siloxane bond or the silica fine particle aggregate having the siloxane bond containing a silanol group and being present in the active material layer; and the active material layer containing a sulfur-based material and a resin-based binder.

A non-aqueous electrolyte battery of the present invention (hereinafter referred to as "a battery of the present invention") preferably includes the electrode of the present invention and an electrode containing an active material capable of alloying with lithium metal or an active material capable of occluding lithium ions.

A battery of the present invention preferably includes the electrode of the present invention and an electrode containing an active material capable of alloying with sodium metal or an active material capable of occluding sodium ions.

A battery of the present invention preferably includes the electrode of the present invention and an electrode containing an active material capable of alloying with potassium metal or an active material capable of occluding potassium ions.

A battery of the present invention preferably includes the electrode of the present invention and an electrode containing an active material capable of alloying with magnesium metal or an active material capable of occluding magnesium ions.

A battery of the present invention preferably includes the electrode of the present invention and an electrode containing an active material capable of alloying with calcium metal or an active material capable of occluding calcium ions.

A battery of the present invention is preferably provided with the electrode of the present invention as a negative electrode.

A battery of the present invention is preferably provided with the electrode of the present invention as a positive electrode.

In the battery of the present invention, it is preferable that at least one of the positive electrode and the negative electrode is lithium-doped.

An assembled battery of the present invention is provided with the battery of the present invention.

An electrical device of the present invention is provided with the battery of the present invention or the assembled battery of the present invention.

A method of manufacturing an electrode for non-aqueous electrolyte batteries of the present invention includes steps of:
  preparing an electrode for non-aqueous electrolyte batteries including a current collector, an active material layer, and a coating material;
  the coating material containing a silicate having a siloxane bond or a silica fine particle aggregate having a siloxane bond as a component;
  the silicate having the siloxane bond or the silica fine particle aggregate having the siloxane bond containing a silanol group and being present at least on a surface of the active material layer;
  the active material layer containing a sulfur-based material and a resin-based binder; and
  applying the coating material to the active material layer.

Effect of the Invention

The electrode for non-aqueous electrolyte according to the present invention is capable of trapping hydrogen sulfide gas generated from the inside of the electrode for some reason in the electrode, and suppressing the outflow of hydrogen sulfide gas to the outside thereof. In addition, the electrode of the present invention is capable of suppressing the elution of lithium polysulfide generated inside the electrode into the electrolytic solution.

BRIEF DESCRIPTION OF DRAWINGS

FIG. 2A shows an example without a coating material, FIG. 2B shows an example with a coating material, and each arrow indicates the outgassing path of generated hydrogen sulfide gas to the outside.

Figure 1:
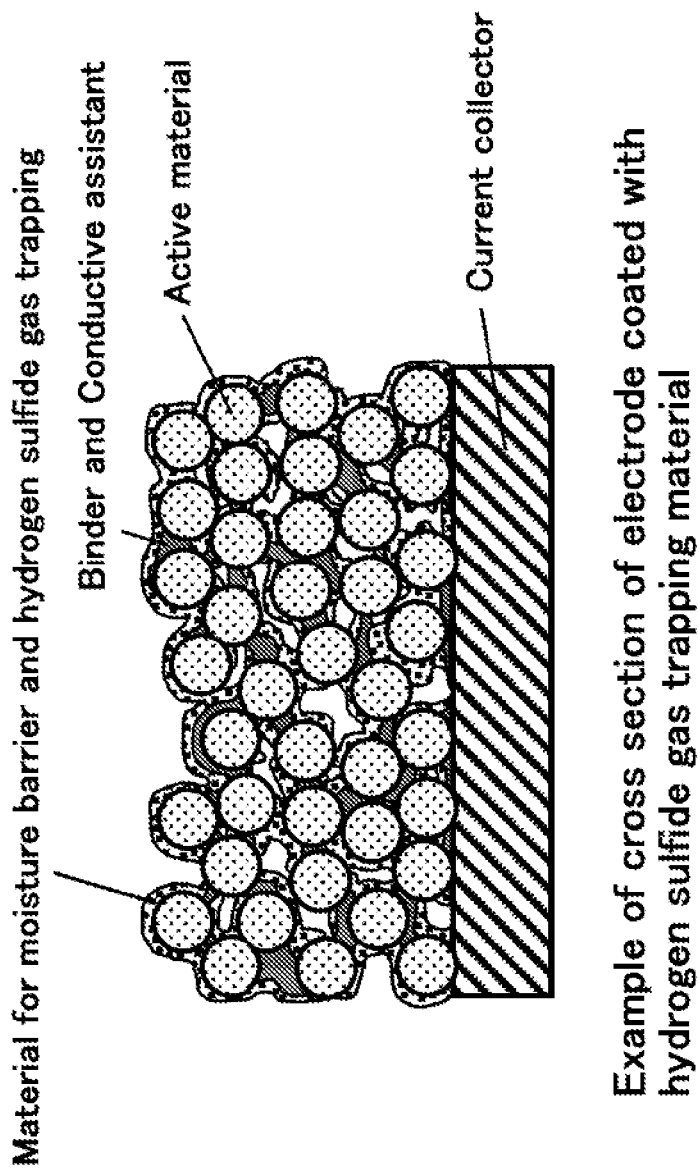
FIG. 1 shows an example of a cross-sectional view of an electrode of the present invention in which a coating material is applied to an active material layer.

First, an electrode of the present invention will be described. In the electrode of the present invention, a coating material functions as a barrier material (protective film) against moisture entering from the outside and prevents direct contact with a sulfur-based material contained in an active material layer. An electrode for a lithium ion battery according to one aspect of the electrode of the present invention has a cross section as shown in FIG. 1, for example. Further, the coating material may be present at least on a surface of the active material layer by applying it to the active material layer of the electrode and drying it. This coating material is capable of suppressing elution of lithium polysulfide produced by the active material into the electrolytic solution.

Although the sulfur-based material as the active material layer does not change in volume as much as Si and Sn, it expands and contracts due to charge and discharge, so the coating material is required to have a certain degree of binding property. If the binding property between the coating material and the active material layer is weak, peeling or cracks occur on the coating material due to the volume change of the active material. When the exposed active material comes into contact with the electrolytic solution, lithium polysulfide is eluted, and the electric capacity of the electrode decreases. Further, in the presence of the exposed active material, hydrogen sulfide gas is generated when moisture enters from the outside.

Therefore, the coating material is preferably a silicate having a siloxane bond or a silica fine particle aggregate having a siloxane bond, which can strongly adhere to the surface of the active material or the active material layer.

Further, the above-mentioned silicate or silica fine particle aggregate preferably contains a silanol group. When the electrode comes into contact with moisture, the silanol group-containing silicate or silanol group-containing silica fine particle aggregate contained in the coating material takes in the moisture entered into the coating material, and an alkaline aqueous solution with a pH value of 9 or more is produced in the coating material.

Figure 2:
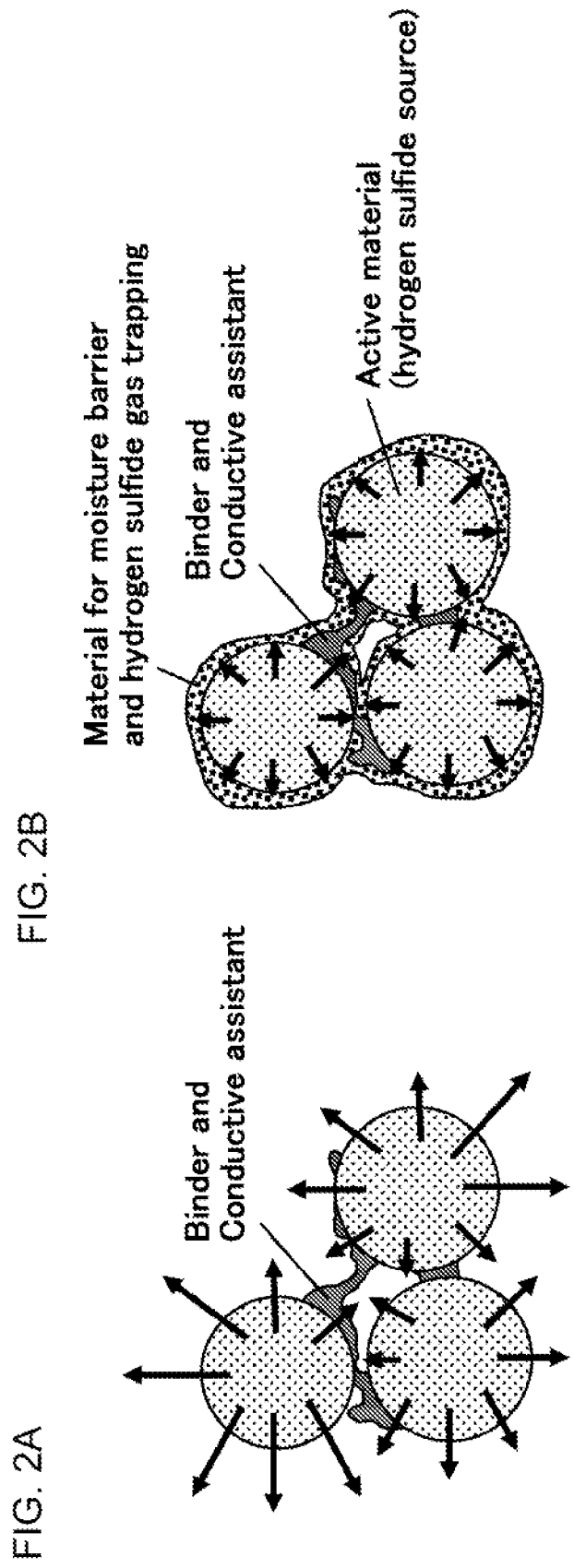
FIG. 2A and FIG. 2B are diagrams showing an outgassing path of generated hydrogen sulfide gas to the outside in the cases of with and without a coating material.
Figure 3:
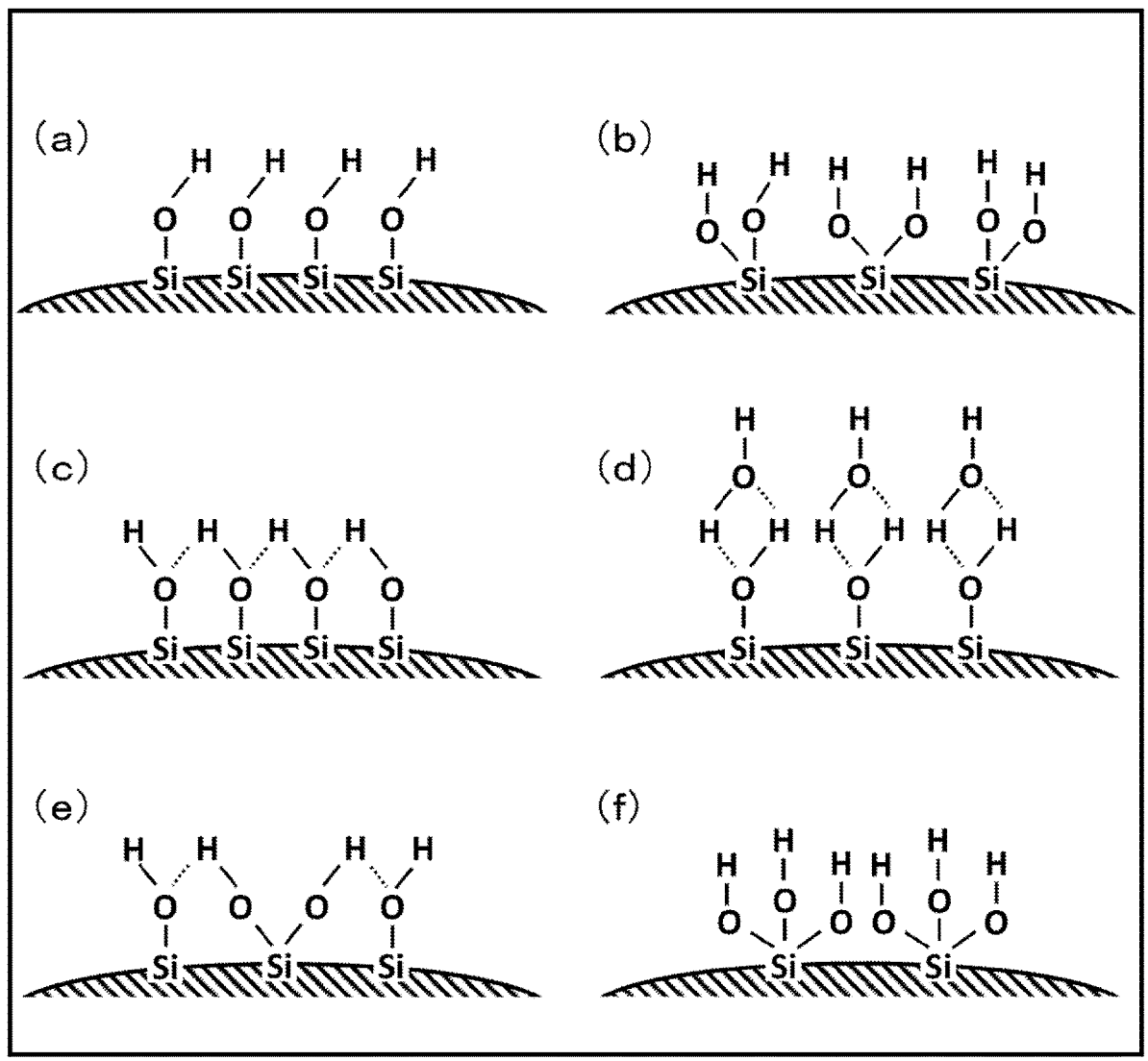
FIG. 3 shows various forms of silanol groups.

Normally, alkali metal sulfides are hydrolyzed when they come into contact with water, and generate hydrogen sulfide gas. However, in the electrode of the present invention, if the sulfur-based material contained in the active layer comes into contact with the alkaline aqueous solution, and the sulfide contained in the sulfur-based material reacts with the moisture of the alkaline aqueous solution to generate hydrogen sulfide gas, the hydrogen sulfide gas is included in the coating material that covers the active material. Therefore, as shown in FIG. 2B, the hydrogen sulfide gas cannot be released to the outside of the electrode unless it passes through the coating material. Whereas, the alkaline aqueous solution generated in the coating material is an excellent trapping material for hydrogen sulfide gas, and has an effect of preventing the hydrogen sulfide gas from being released to the outside of the electrode because the hydrogen sulfide gas is dissolved in the alkaline aqueous solution and neutralized.

That is, the electrode of the present invention has a structure that, when the electrode comes into contact with moisture, the coating material suppresses the contact between the sulfur-based material and the moisture, and also suppresses the release of the hydrogen sulfide gas, generated by a reaction between sulfide contained in the sulfur-based material and the moisture, to the outside of the electrode.

The silanol group is a functional group represented by a chemical formula —Si—OH in which a hydroxyl group (—OH) is bonded to silicon. Various silicon compounds such as silyl alcohol, silicone resin, and silanol-modified organosilicon are present as materials having a silanol group. In the present invention, the coating material is a silicate or silica fine particles aggregate having a siloxane bond as a component. The reason why the coating material has a siloxane bond (Si—O—Si) as a component is, when the siloxane bond is hydrolyzed, the silanol group is effectively generated.

For example, the silanol group exists in various forms as shown in FIGS. 3A to 3F. The silanol group may be trapped in the pores of the coating material. The pores contained in the silicate or silica fine particles can also be expected to have effects such as physical adsorption of hydrogen sulfide gas. The pores are preferably 0.1 nm or more and 1000 nm or less, and more preferably 0.5 nm or more and 500 nm or less, based on the diameter or width thereof.

The mechanism of action by which the coating material having the silanol group traps hydrogen sulfide gas is complicated, and various mechanisms of action are expected depending on the amount of moisture and the type of the coating material. However, it is considered that adsorption by chemical bond by silanol group, dissolution by adsorbed moisture of the coating material and neutralization reaction, physical adsorption by pores, etc. are combined to act.

The siloxane bond contained in the coating material is hydrolyzed by the moisture inside the battery or the moisture supplied from outside the cell to generate a silanol group. It is considered that the silanol group undergoes a dehydration reaction with hydrogen sulfide gas to form a chemical bond.

The silicate undergoes a dehydration condensation reaction of silanol groups by heat treatment and cures while forming a siloxane bond. When the cured silicate comes into contact with water, a siloxane structure changes to a silanol structure. Although it depends on the conditions for forming a siloxane bond, the siloxane structure usually becomes less likely to change to a silanol structure as the temperature of the heat treatment increases. That is, the siloxane structure formed at a low temperature changes to the silanol structure relatively easily when it comes into contact with water.

In addition to the silicate, inorganic materials containing the siloxane bond include silica sol (colloidal silica). Silica sol is a colloidal solution in which fine particles of silica (silicon oxide) are dispersed in water. The silica dispersed in the liquid has a particle size of 1 nm or more and 500 nm or less, and has hydroxyl groups and silanol groups on the surface thereof. When the silica sol is dried, it becomes an aggregate of silica fine particles. An aggregate is an agglomeration formed by fine particles dispersed in a liquid. Similar to the silicate, the silica fine particles obtained from the silica sol form the siloxane bond by dehydration condensation reaction by heat treatment, and the siloxane bond is formed inside the oxide particles.

Since the sol does not easily shrink continuously when dried, the coating film that generated cracks adheres to the active material layer. Therefore, when comparing the silicate and the silica sol, the silicate is preferable, and the amount of lithium polysulfide eluted into the electrolyte can be suppressed, which enables the battery to have a higher capacity and longer life. Further, although the aqueous solution in which the silicate is dissolved shows strong alkalinity (pH 10 or more), it does not react exceptionally with aluminum, so that aluminum can be used as the current collector.

However, since the silicate does not dissolve in organic solvents, it is a water-based (aqueous) coating material. On the other hand, the silica sol has an advantage that the nano-level silica sol can be dispersed in an organic solvent in addition to water.

A colloidal solution in which silica fine particles are dispersed in an organic solvent is also called an organosilica sol, and can be dispersed in various organic solvents such as alcohol, ketone, ether, aldehyde, amine, ester, lactone, terpene, thiol, toluene, xylene, N-methyl-2-pyrrolidone (NMP), etc. Therefore, it is possible to combine it with a material that reacts in contact with water, or to make it a composite with a resin that was not dissolved in water.

The silicate containing a siloxane bond may be an alkali metal silicate, a silicate of a guanidine compound, or a silicate of an ammonium compound.

There are various kinds of silicate, for example: polysilicates such as orthosilicates ($A_4SiO_4$), metasilicates ($A_2SiO_3$), pyrosilicate ($A_6Si_2O_7$), disilicate ($A_2Si_2O_5$), and tetrasilicate ($A_2Si_4O_9$), $A_2Si_2O_5$, $A_2Si_3O_7$, and $A_2Si_4O_9$. These may also be hydrates (A: alkali metal element, a guanidine group, a triethanolammonium group, or a tetramethanolammonium group).

In general, a silicate tends to have a lower melting point as the proportion of A in the silicate increases, and at the same time, it shows solubility in water. Industrially, it is possible to continuously change the proportion of A in the silicate, so that any salt can be prepared. The general molecular formula of the silicate is expressed in the form of $A_2O \cdot nSiO_2$.

A is at least one kind of an alkali metal element (Li, Na, K, Rb, Cs), a guanidine group, a triethanolammonium group, and a tetramethanolammonium group, and n is 0.5 or more and 5.0 or less.

Preferably, in this silicate, A of the general formula is Li, Na, or K. When these alkali metal elements come into contact with water, the siloxane structure tends to change to the silanol structure. In particular, Li easily changes to the silanol structure, and a resultant coating material has a high ionic conductivity, so that the input/output characteristics of the battery are excellent. In addition, Na or K is excellent in the mechanical strength of the coating material, binding properties between the coating material and the active material, and wear resistance of the electrode.

Preferably, the silicate has n in the general formula of 0.7 or more and 3.5 or less, more preferably 0.8 or more and 3.0 or less. If the number n of $SiO_2$ exceeds 5.0, the trapping property of the coating material to trap hydrogen sulfide gas becomes poor. In addition, the binding property to bind with the active material layer is poor, and peeling and cracking remarkably tend to occur due to a volume change of the electrode during charge and discharge and external factors such as a nail penetration test.

By contrast, if n is less than 0.5, the viscosity is so high that it becomes difficult for the coating material infiltrating or being applied to the electrode active material layer.

In the case that the silicate has an alkaline element as A and a sulfur-based material is used as the active material, when this silicate is applied to the active material layer, an alkali metal sulfate is generated between the active material and the coating material.

Hydrogen sulfide gas shows weak acidity when dissolved in water ($H_2S \Leftrightarrow HS^- + H^+$). If the coating material is in the alkaline region, hydrogen sulfide ions ($HS^-$) are unlikely to become hydrogen sulfide gas, but hydrogen sulfide gas tends to be generated as the pH becomes low and shifts to the acidic region.

Except for elemental sulfur, a sulfuric acid radical remains in a sulfur-based material. Therefore, the sulfur-based material shows strong acidity (pH 3 or less) when it comes into contact with water before lithiated. The alkali metal silicate, and the sulfuric acid radical contained in the sulfur-based material produce an alkali metal sulfate as shown in the following reaction formula.

$$A_2O \cdot nSiO_2 + 2H^+ + SO_4^{2-} \rightarrow nSiO_2 + A_2SO_4 + H_2O$$

Part of the Si sites in the silicic acid compound may be substituted by a transition metal element such as Al, Zr, Ti, Mg, Mo, Sr, Ca, Zn, Ba, B, W, Ta, Ce, Hf and Y.

Further, these structures can be roughly classified into crystalline and non-crystalline, but are preferable to be amorphous in which the siloxane structure easily changes to the silanol structure when in contact with water. Furthermore, if the structure is amorphous, it does not crack in a specific direction unlike crystals, therefore, it can trap hydrogen sulfide gas more effectively. In addition, since the resistance to hydrofluoric acid is improved, electrode disintegration derived from hydrofluoric acid is less likely to occur.

Normally, an amorphous solid consists of a disordered molecular arrangement and has no distinguishable crystal lattice. In addition, the amorphous solid has a higher solubility than a crystalline form, and does not have a fixed melting point. Therefore, the amorphous form is shown by the absence of a definite peak in a powder X-ray diffraction (XRD) pattern and the absence of a melting endothermic peak in a differential thermal analysis (DTA) curve and a differential scanning calorimetry (DSC) curve.

That is, in XRD, an amorphous silicate or silica fine particle aggregate has no sharp peak, which is a feature of the crystalline form, and shows a typical broad peak, so-called halo pattern, at a diffraction angle ($2\theta$) in the range of 15° to 40° by Cu-K$\alpha$ rays.

Even if a halo pattern is obtained by XRD, every structure is not amorphous. However, this is in the limited conditions where the size of crystal grains is less than 5 nm by the Scherrer equation represented by Formula 1. That is, when the size of crystal grains is 5 nm or more, the diffraction line is broad, not forming a pattern similar to the amorphous form.

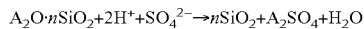

$$D (\text{Å}) = 0.9\lambda/(\beta \times \cos \theta) \quad \text{(Formula 1)}$$

(Where, D is the size of crystal grains, $\lambda$ is the wavelength of an X-ray tube, $\beta$ is the expanse of the diffraction line depending on the size of crystal grains, and $\theta$ is the diffraction angle).

Further, since a change from an amorphous state to a crystalline state generates large heat, it is possible to determine the crystalline state of silicate or silica fine particle aggregates by measuring this heat generation.

An amorphous silicate can be obtained by heat-treating of the electrode at a heating rate of 10° C./h or more and at a temperature of 80° C. or more and 600° C. or less, though it depends on the environment and time of the heat treatment.

With regard to silicate, as the same applies to silica sol, the amount of the silanol group in the silicate tends to decrease as the temperature of the heat treatment increases. In the present invention, since the silanol group is an essential component for the reaction with hydrogen sulfide gas, the amount of the silanol group in the coating material is preferably 100 ppm or more, more preferably 200 ppm or more, still more preferably 300 ppm. Therefore, preferably, an upper limit to the temperature of the heat treatment is 350° C. or lower, more preferably 250° C. or lower, and still more preferably 180° C. or lower.

The amount of the silanol group can be quantified from the attribution of the spectrum that is obtained by the dipole decoupling/magic angle spinning method in Si-NMR measurement.

Further, it is preferable that the coating material further contains a surfactant. With the surfactant, the coating material has an improved lyophilicity to the active material layer, and can easily permeate into the active material layer uniformly. Therefore, a uniform coating material is formed in the active material layer, and the trapping property of hydrogen sulfide gas is further improved. If the content of the sulfur component is high, the sulfur-based material may exhibit water repellency. In the case of the active material layer containing a sulfur-based material, the content of the surfactant with respect to the coating agent may be 0.001% by mass or more and 5.0% by mass or less. If the content of the surfactant is less than 0.001% by mass, it may be difficult for the coating material to permeate into the active material layer, and if it exceeds 5% by mass, the coating material foams in the surface of the active material layer and causes the electrode performance likely to vary, and it becomes necessary to add a defoamant.

As the surfactant, a nonionic surfactant, an anionic surfactant, a cationic surfactant, an amphoteric surfactant, a nonionic surfactant, and the like may be used.

Further, it is preferable that the coating material further contains a metal salt of at least one kind of transition metal element selected from Mn, Mg, Ca, Fe, Co, Ni, Cu, Zn, Al, Ba and Cu. The coating material containing metal salts of these transition metal elements can more effectively trap hydrogen sulfide gas. Mn, Fe, Co, Ni, Cu, Zn and Al are more preferable. As the metal salt, an inorganic salt such as sulfuric acid, hydrochloric acid, nitric acid or phosphoric acid, or an organic salt such as formic acid, acetic acid and oxalic acid can be used. In addition, as the metal salt, phosphate is preferable from the viewpoint of improving the water resistance of the coating material. If the water resistance of the coating material is low, the coating material may disappear when it comes into contact with water, and the trapping function may be deteriorated.

For the metal salt, when the total amount of the transition metal element and the silicon element in the silicate is 100 mol %, the transition metal element is preferably 1 mol % or more and 80 mol % or less, and more preferably 10 mol % or more and 70 mol % or less, and desirably 20 mol % or more and 60 mol % or less. If the transition metal element is less than 1 mol %, the effect of trapping hydrogen sulfide gas is not remarkably exhibited. As the amount of the transition metal element increases, the effect of trapping hydrogen sulfide gas tends to increase, but if it exceeds 80 mol %, the trapping ability decreases.

The coating material preferably further contains at least one kind of $A_2CO_3$ or $AHCO_3$ (A is at least one kind of alkali metal element selected from Li, Na, K, Rb, and Cs). A carbonate compound or hydrogen carbonate compound of these alkali metal elements has low solubility in water, but its aqueous solution is alkaline, so that the coating material can trap the hydrogen sulfide gas more effectively.

The content of $A_2CO_3$ or $AHCO_3$ may be 1% by mass or more and 50% by mass or less with respect to the coating material.

The coating material may be a silicate mixed with $A_2CO_3$ or $AHCO_3$ powder, but for the reason that the water resistance of the coating material is greatly improved, it is preferable to produce $A_2CO_3$ or $AHCO_3$ by allowing the silicate to absorb a carbonic acid source. If the water resistance of the coating material is low, the coating material may disappear when it comes into contact with water, and the trapping function may be deteriorated.

The carbonic acid source may be any material that reacts with silicic acid to produce $A_2CO_3$ or $AHCO_3$. Examples of the carbonic acid source include: carbon oxides such as carbon dioxide gas (carbonic acid gas), liquefied carbon dioxide (liquefied carbonic acid gas), dry ice (solid carbon dioxide), and carbon monoxide; carbonates such as calcium carbonate and magnesium carbonate; and hydrogen carbonates such as sodium hydrogen carbonate and calcium hydrogen carbonate. Of these, carbon dioxide gas is preferable.

As a method of allowing the silicate to absorb the carbonic acid source, for example, an electrode coated with the coating material may be left in a carbon dioxide gas atmosphere. At this time, the carbon dioxide gas atmosphere is preferably 0.12 MPa or more.

As another method of absorbing the carbon acid source, for example, an electrode may be left in contact with liquefied carbon dioxide (liquefied carbon dioxide gas) or dry ice (solid carbon dioxide), or the coating material in a state in contact with the hydrogen carbonates may be baked.

The coating material may further contain carbon. When the coating material contains carbon, it is possible to impart electronic conductivity to the coating material. The amount of carbon contained in the coating material may be 0.1% by mass or more and 70% by mass or less when the total of the coating material and carbon is 100% by mass. As carbon, the same material as the conductive assistant described later can be used.

As a method of improving the electron conductivity of the active material, there is a method of supporting carbon on the surface of the active material by heat-treating the hydrocarbon gas or the like as a carbon precursor together with the active material. However, when the active material is a sulfur-based material, even though it is the sulfur-based material (sulfur-modified polyacrylonitrile) having an excellent heat resistance as disclosed in NPL 1, there is a problem that the hydrocarbon gas acts as a reducing agent, the sulfur content in the active material becomes hydrogen sulfide gas, and the sulfur content in the active material decreases.

In addition, there is another method of compounding the active material and carbon by mechanical pulverizing treatment such as a ball milling, a jet mill, or a crusher. However, when the active material is a sulfur-based material, there is a problem that the sulfur-based material is subject to the external forces such as impact, tension, friction, compression, and shear by the mechanical pulverizing treatment, pulverization and strain are generated to cause disintegration, and the sulfur component that is easily soluble to electrolyte solvent is exposed.

In this way, in order to improve the electronic conductivity in the active material layer, it is preferable to use a pre-carbonized material (carbon) instead of a carbon coat by thermal decomposition of the carbon precursor. At the same time, it is preferable not to apply the mechanical external force to the sulfur-based material. That is, these problems can be solved by coating the active material layer with a coating material containing carbon.

The electrode according to the present invention is an electrode for a non-aqueous electrolyte battery. The non-aqueous electrolyte battery is a battery that water is not a main component of the non-aqueous electrolyte, such as a lithium ion battery, a sodium ion battery, and a potassium ion battery, a magnesium ion battery, a calcium ion battery. Further, the lithium ion battery is a battery that water is not a main component of the non-aqueous electrolyte, and lithium ions are included in ions responsible for electrical conduction. It is, for example, a lithium ion battery, a metallic lithium battery, a lithium polymer battery, a solid-state lithium battery, an air lithium ion battery, and may be a primary battery or a secondary battery (storage battery). The same applies to other non-aqueous electrolyte batteries.

Whereas the electrodes used in these batteries include a positive electrode and a negative electrode, when a sulfur-based material is used as the active material of the electrodes, the charge and discharge voltage is 1 V or more and 3 V or less (vs. Li/Li$^+$), therefore, the sulfur-based material can be used as the active material for both positive and negative electrodes. Examples of the sulfur-based material include elemental sulfur, carbon sulfide, polysulfide, polysulfide carbon, sulfur-modified polyacrylonitrile, disulfide compounds, sulfur-modified rubber, sulfur-modified pitch, sulfur-modified anthracene, sulfur-modified ethylene glycol, metal sulfide, and the like. These sulfur-based materials are solid materials that, when lithiated, decompose by contact with water to generate hydrogen sulfide gas. The elemental sulfur is not particularly limited, but α-sulfur, β-sulfur, and γ-sulfur having an $S_8$ structure can be used.

From the viewpoint that lithium polysulfide is difficult to elute into the electrolytic solution and excellent in electron conductivity of materials, the sulfur-based material is preferably a sulfur-based material that contains sulfur of 10% by mass or more and 90% by mass or less, carbon of 10% by mass or more and 90% by mass or less, and hydrogen of 0% by mass or more and 10% by mass or less based on the results of elemental analysis (ICP), rather than elemental sulfur or metal sulfide. Examples of the sulfur-based material include carbon sulfide, polysulfide, polycarbon sulfide, sulfur-modified polyacrylonitrile, disulfide compound, sulfur-modified rubber, sulfur-modified pitch, sulfur-modified anthracene, etc.

More preferably, from the viewpoint of excellent electric capacity and cycle characteristics of the electrode, the sulfur-based material is a sulfur-modified polyacrylonitrile that contains sulfur of 10% by mass or more and 80% by mass or less, carbon of 20% by mass or more and 90% by mass or less, hydrogen of 0% by mass or more and 10% by mass or less, and nitrogen of 5% by mass or more and 30% by mass or less, based on the result of elemental analysis.

The sulfur-based material preferably has a median diameter ($D_{50}$) of 0.1 μm or more and 20 μm or less. The median diameter is a volume-based diameter, and a diameter of secondary particles is measured by a laser diffraction/scattering method. By setting the median diameter of the sulfur-based material within the above range, the battery performance is improved without requiring a great deal of labor, and peeling of an electrode mixture layer or the like is less likely to occur. The median diameter of the sulfur-based material is more preferably 1 μm or more and 20 μm or less, and further preferably 1 μm or more and 15 μm or less.

Further, the sulfur-based materials described above may be used alone, in combination of two or more thereof, or mixed with a positive electrode active material or a negative electrode active material described later.

The shape of the sulfur-based material when used as an active material is not particularly limited, and may be a spherical shape, an elliptical shape, a facet shape, a belt shape, a fiber shape, a flake shape, a donut shape, or a hollow shape. Further, the sulfur-based material may contain a compound that decomposes into a solid electrolyte in the process of initial charge or discharge, or a compound that can occlude and release alkali metal ions.

The solid electrolyte is not particularly limited as long as it is a substance having ionic conductivity, but it is preferably a solid electrolyte represented by $Li_\alpha X_\beta Y_\gamma$. Here, in the formula, $0<\alpha\le4$, $0\le\beta\le2$, $0\le\gamma\le5$. The solid electrolyte can also be used as a buffer material for a material capable of reversibly occluding and releasing lithium ions.

Examples of X include one or more kinds of Si, Ti, Mg, Ca, Al, V, Ge, Zr, Mo, and Ni. Examples of Y includes one or more kinds of O, S, F, Cl, Br, I, P, $B_2O_3$, $C_2O_4$, $CO_3$, $PO_4$, S, $CF_3SO_3$, and $SO_3$. Specific examples of the solid electrolyte include LiF, LiCl, LiBr, LiI, $Li_3N$, LiPON, $Li_2C_2O_4$, $Li_2CO_3$, $LiAlCl_4$, $Li_2O$, $Li_2S$, $LiSO_4$, $Li_2SO_4$, $Li_3PO_4$, $Li_3VO_4$, $Li_4GeO_4$, $Li_2Si_2O_5$, $Li_2SiO_3$, $Li_4SiO_4$, $Li_4ZrO_4$, $LiMoO_4$, $LiAlF_4$, $Li_3Ni_2$, $LiBF_4$, $LiCF_3SO_3$, etc. Among these, one kind or two or more kinds can be used.

Examples of the compound that decomposes into the solid electrolyte and the compound that can occlude and release alkali metal ions include SiO, GeO, GeS, $GeS_2$, SnO, $SnO_2$, $SnC_2O_4$, $SnO$—$P_2O_5$, $SnO$—$B_2O_3$, SnS, $SnS_2$, $Sb_2S_3$, $SnF_2$, $SnCl_2$, $SnI_2$, $SnI_4$, etc., and two or more kinds of these may be used.

When an active material powder having a small particle size is used, there are some cases where the disintegration of particles is reduced which may improve the life characteristics of the electrode, and the specific surface area increases which may improve the output characteristics. For example, according to a non-patent document (Latest Technological Trends of Rare Metal-Free Secondary Batteries, Chapter 3, Section 1, Paragraph 4, PP. 125-135, CMC Publishing Co. Ltd., 2013), it is described that as the particle size of the active material decreases, the initial discharge capacity increases and the cycle life is also improved. It can be seen that the particle size of the active material correlates with the initial charging and discharging efficiency and the cycle life of the secondary battery.

However, since nano-sized active materials are difficult to handle, it is preferable to use granulated materials. For example, Japanese Patent No. 5525003 discloses a negative electrode for a non-aqueous electrolyte secondary battery having an active material layer on a current collector, the active material layer containing a granulating binder which is one or more of polyimide, polybenzimidazole, styrene-butadiene rubber, polyvinylidene fluoride, carboxylmethylcellulose, and polyacrylic acid, and silicon as nano-sized active material particles. Sulfur-based materials do not change in volume as much as silicon, but when the particle size of sulfur-based materials as active materials decreases to nano size, the area in contact with the electrolytic solution increases and lithium polysulfide becomes easy to elute, which may cause a decrease in the electric capacity and deterioration of cycle characteristics.

Therefore, by granulation using the coating material, which contains the silicate having the siloxane bond or the silica fine particle aggregate having the siloxane bond, and the sulfur-based material used as the active material, the coating material coats the particles of the active material, and makes it possible to suppress the elution of lithium polysulfide. In that case, it is preferable that the primary particles of the active material have a median diameter ($D_{50}$) in the range of 0.01 μm or more and 20 μm or less, and the active material particles after the granulation (secondary particles) have a median diameter ($D_{50}$) in the range of 0.5 μm or more and 100 μm or less.

As granulated, the coating material can partially or entirely cover the surface of the sulfur-based material used as the active material, and can suppress the elution of lithium polysulfide.

As for a method for granulating the active material, a known granulation method can be applied, such as a fluidized bed granulation method, a stirring granulation method, a rolling granulation method, a spray-drying method, an extrusion granulation method, a rolling method and a coating granulation method. Of these, the spray-drying method and the fluidized bed granulation method are particularly preferable because they are relatively easy to coat uniformly.

In the spray-drying method, for example, suspension in which an active material is dispersed in a coating material is sprayed from above into a greenhouse heated to 50° C. or higher and 300° C. or lower under a condition of 1 mL/min or more and 30 mL/min or less, and air pressure of 0.01 MPa or more and 5 MPa or less to form aggregated granules, and granules can be obtained by drying the aggregated granules.

In the fluidized bed granulation method, for example, a powdered active material is placed in a fluidized bed granulator and warm air heated to 50 to 300° C. is blown from below to fluidize and mix the powdered active material (granule precursor), and water in which the coating material is dissolved in this granule precursor is sprayed from above with a nozzle, and the coating material is uniformly sprayed to a powder surface under a condition of 1 mL/min or more and 30 mL/min or less, and the air pressure of 0.01 MPa or more and 5 MPa or less to form aggregated granules, and granules can be obtained by drying the aggregated granules.

Since sulfur-based materials before being lithiated show strong acidity when they come into contact with water, the use of a water-based binder may cause a problem of oxidizing the current collector, and it is preferable that the current collector, which will be described later, has a carbon layer.

Furthermore, by coating the active material layer containing the sulfur-based material with the coating material which contains the silicate having the siloxane bond or the silica fine particle agglomerate having the siloxane bond, the acid in the sulfur-based material is neutralized to generate a sulfate, and the damage to the current collector caused by the use of the water-based binder may be reduced. In addition, the high temperature durability of the electrode may be improved.

An aqueous solution in which a silicate is dissolved shows strong alkalinity (pH 10 or higher), but does not exceptionally react with aluminum. Therefore, when a current collector is made of aluminum, the damage to the current collector by alkali metal silicates is small.

In the electrode of the present invention, the active material layer contains a sulfur-based material and a resin-based binder as an active material. The resin-based binder may be a commonly used organic material such as polyvinylidene fluoride (PVdF), polytetrafluoroethylene (PTFE), polyimide (PI), polyamide, polyamideimide, aramid, polyacrylic, styrene butadiene rubber (SBR), ethylene-vinyl acetate copolymer (EVA), styrene-ethylene-butylene-styrene copolymer (SEBS), carboxymethyl cellulose (CMC), sodium carboxymethyl cellulose (CMC-Na), polyacrylonitrile, xanthan gum, polyvinyl alcohol (PVA)), ethylene vinyl alcohol, polyvinyl butyral (PVB), ethylene vinyl alcohol, polyethylene (PE), polypropylene (PP), polyacrylic acid, lithium polyacrylate, sodium polyacrylate, potassium polyacrylate, ammonium polyacrylate, methyl polyacrylate, ethyl polyacrylate, amine polyacrylate, polyacrylic acid ester, epoxy resin, polyethylene terephthalate (PET), polybutylene terephthalate (PBT), nylon, vinyl chloride, silicone rubber, nitrile rubber, cyanoacrylate, uria resin, melamine resin, phenol resin, latex, polyurethane, silylated urethane, nitrocellulose, dextrin, polyvinylpyrrolidone, vinyl acetate, polystyrene, chloropropylene, resorcinol resin, polyaromatic, modified silicone, methacrylic resin, polybutene, butyl rubber, 2-propenoic acid, cyanoacrylic acid, methyl methacrylate, glycidyl methacrylate, acrylic oligomer, 2-hydroxyethyl acrylate, alginic acid, starch, japan, sucrose, glue, casein, and cellulose nanofibers, which is used alone or in combination with two or more of them.

Further, in the electrode of the present invention, a mixture of the resin-based binder and an inorganic binder may also be used. The inorganic binder may be, for example, sol-based or cement-based, in addition to silicate-based and phosphate-based as described in Patent Literature (JP6149147B, JP2018-063912A). For example, the following inorganic materials can be used alone or in combination: lithium silicate, sodium silicate, potassium silicate, cesium silicate, guanidine silicate, ammonium silicate, silicofluoride salt, borate, lithium aluminate, sodium aluminate, potassium aluminate, aluminosilicate, lithium aluminate, sodium aluminate, potassium aluminate, polyaluminum chloride, polyaluminum sulfate, polyaluminum silicate sulfate, aluminum sulfate, aluminum nitrate, ammonium alum, lithium alum, sodium alum, potassium alum, chrome alum, iron alum, manganese alum, nickel ammonium sulfate, diatomaceous earth, polyzirconoxane, polytantaloxane, mullite, white carbon, silica sol, colloidal silica, fumed silica, alumina sol, colloidal alumina, fumed alumina, zirconia sol, colloidal zirconia, fumed zirconia, magnesia sol, colloidal magnesia, fumed magnesia, calcia sol, colloidal calcia, fumed calcia, titania sol, colloidal titania, fumed titania, zeolite, silicoaluminophosphate zeolite, sepiolite, montmorillonite, kaolin, saponite, aluminum phosphate, magnesium phosphate, calcium phosphate, iron phosphate, copper phosphate, zinc phosphate, titanium phosphate, manganese phosphate, barium phosphate, tin phosphate, low melting point glass, plaster, gypsum, magnesium cement, litharge cement, portland cement, slag cement, fly ash cement, silica cement, phosphate cement, concrete, and solid electrolyte. Of these, from the viewpoints of binding property, electrolyte elution resistance, oxidation/reduction resistance, energy density, etc., it is preferable that the inorganic binder includes an inorganic material of lithium silicate, sodium silicate, potassium silicate, guanidine silicate, ammonium silicate, silicofluoride salt, aluminosilicate, aluminum phosphatet, magnesium phosphate, and calcium phosphate.

Since the inorganic binder has a large specific gravity, the electrode energy density per electrode weight may decrease if a large amount of the inorganic binder is mixed. It is preferable that the electrode of the present invention does not contain the inorganic binder.

When the resin-based binder is dispersed or dissolved using a solvent, if the solvent is an organic solvent such as NMP, the sulfur-based material contained in the active material layer may dissolve in the organic solvent and the electric capacity of the electrode may decrease. Therefore, in the electrode of the present invention, the resin-based binder is preferably a water-based (aqueous) binder. The water-based binder represents a binder in which the solvent used for dispersing or dissolving the binder component is water, and examples thereof include styrene butadiene rubber, carboxymethyl cellulose, sodium carboxymethyl cellulose, polyacrylic acid, polyimide, and polyacrylonitrile, etc.

In the case the electrode has the water-based binder, the battery operated in a high-temperature environment is difficult to swell because the water-based binder absorbs the electrolyte solvent, which makes it possible to obtain a battery with excellent high-temperature durability.

The content of the resin-based binder in the electrode of the present invention is preferably 0.1% by mass or more and 60% by mass or less, and more preferably 0.5% by mass or more and 30% by mass or less when the total of the active material, the resin-based binder and the conductive assistant is 100% by mass.

If the resin-based binder is less than 0.1% by mass, the mechanical strength of the electrode is low, so that the active material is likely to fall off when coated with the coating material, and the cycle life characteristics of the battery may deteriorate. On the other hand, when it exceeds 60% by mass, the ionic conductivity and the electronic conductivity become low, and the proportion of the active material as the electrode becomes small, so that the capacity density of the electrode may decrease.

In the electrode of the present invention, the active material layer can contain a conductive assistant if necessary. The conductive assistant is not particularly limited as long as it has electronic conductivity, and examples thereof include metals, carbon materials, conductive polymers, conductive glass, etc. From the viewpoint of high electron conductivity and oxidation resistance, carbon is preferable. Specifically, examples include acetylene black (AB), Ketjen black (KB), furnace black (FB), thermal black, lamp black, channel black, roller black, disc black, carbon black (CB), carbon fiber (for example, vapor-grown carbon fiber named VGCF, which is a registered trademark), carbon nanotube (CNT), carbon nanohorn, graphite, graphene, glassy carbon, amorphous carbon, etc., and one kind or two or more kinds of these may be used.

The content of the conductive assistant in the electrode of the present invention is preferably 0 to 30% by mass when the total of the active material, the resin binder and the conductive assistant is 100% by mass. That is, the conductive assistant is contained as needed. If it exceeds 30% by mass, the proportion of the active material as a battery is small, so that the capacity density of the electrode tends to be low.

In the electrode of the present invention, a material of the current collector is not particularly limited as long as it has electronic conductivity and is capable of conducting electricity to the sulfur-based material maintained as the active material. However, when used as the current collector for the negative electrode, it is preferable that the material is difficult to alloy with lithium. When used as the current collector for the positive electrode, it is preferable that the material is not easily oxidized. For example, when used as the current collector for the negative electrode, it is possible to use a conductive substance such as C, Ti, Cr, Ni, Cu, Mo, Ru, Rh, Ta, W, Os, Ir, Pt, Al, and Au, and an alloy containing two or more kinds of these conductive substances (for example, stainless steel, Ni—Fe alloy).

For example, when used as the current collector for the positive electrode, it is possible to use a conductive substance such as C, Ti, Cr, Ni, Cu, Mo, Ru, Rh, Ta, W, Os, Ir, Pt, Au, and Al, and an alloy containing two or more kinds of these conductive substances (for example, stainless steel, Al—Fe alloy). In addition, the material may be a multilayer structure of dissimilar metals such as iron coated with Al and Al coated with C. Al or an alloy using Al is preferable because of the material cost of the current collector and the lightness of the battery.

Examples of the shape of the current collector include linear, rod, plate, foil, porous, etc. Of these, the porous shape is preferable because the filling density can be increased and the coating material can easily permeate into the active material layer. Examples of the porous shape include a mesh, a woven fabric, a non-woven fabric, an embossed body, a punched body, an expanded body, and a foamed body. In particular, the embossed body or the foamed body is preferable because of its good output characteristics. The porosity of the porous current collector is not particularly limited, but may be 1% or more and 95% or less.

The electrode of the present invention includes the above-mentioned current collector, the active material layer containing the sulfur-based material and the resin-based binder, and the coating material containing the silicate having the siloxane bond or the silica fine particle aggregate having the siloxane bond. The electrode of the present invention can be manufactured by forming the active material layer on the current collector and further applying the coating material to the active material layer.

Further, in the electrode of the present invention, the coating material, which contains the silicate having the silanol group or the silica fine particle aggregate having the silanol group, may be present in the active material layer. For example, after the coating material is applied to the active material layer, the coating material permeates into the active material layer, so that the specific area of the coating material that traps hydrogen sulfide gas in the active material layer becomes large. As a result, hydrogen sulfide gas generated from the active material can be efficiently trapped.

Further, in the electrode of the present invention, it is preferable that the coating material is present in the active material layer and that there are gaps between the active material particles in the active material layer. For example, there is a phenomenon that after the coating material is applied to the electrode, although the coating material permeates into the active material layer, in the active material layer, the gaps between the active material particles are not completely filled with the coating material and remain. This may enables to not only increase the specific area of the coating material for trapping the hydrogen sulfide gas, but also increase the permeability of the electrolytic solution into the active material layer, which may improve the output characteristics of the battery. In addition, it becomes easier to allow the expansion and contraction of the active material during charge and discharge, and it becomes possible to suppress the occurrence of wrinkles and cracks in the current collector of the electrode.

Although the amount of the coating material applied to the electrode varies depending on the capacity per unit of the electrode, for example, when a single-sided coating of the coating material is applied to the electrode, and the capacity per unit area of the electrode subject to the single-sided coating is 3 mAh/cm$^2$, the preferable coating amount of the coating material on the electrode is 0.01 mg/cm$^2$ or more and 3 mg/cm$^2$ or less, and more preferably, the coating material per unit area of the electrode subject to the single-sided coating is 0.02 mg/cm$^2$ or more and 0.5 mg/cm$^2$ or less.

When a double-sided coating of the coating material is applied to the electrode, and the capacity per unit area of the electrode subject to the double-sided coating is 3 mAh/cm$^2$, the preferable coating amount of the coating material on the electrode is 0.02 mg/cm$^2$ or more and 6 mg/cm$^2$ or less, and more preferably, 0.05 mg/cm$^2$ or more and 0.3 mg/cm$^2$ or less.

In the electrode of the present invention, when the total solid content of the active material, the resin-based binder, the conductive assistant, and the coating material is 100% by mass, although the content of the coating material varies depending on the capacity per unit area of the electrode, for example, when the capacity per unit area of the electrode subject to the single-sided coating is 3 mAh/cm$^2$, the content of the coating material is preferably 0.1% by mass or more and 30% by mass or less, more preferably 0.2% by mass or more and 20% by mass or less, and still more preferably 0.5% by mass or more and 10% by mass or less.

Generally, when a coating material is applied to a surface of an electrode, an electrode resistance increases. This is because the coating material reduces ionic conductivity. However, the electrode of the present invention can have a small polarization by setting the coating amount of the coating material in the above-mentioned range, and a battery using this electrode is excellent in input/output characteristics. This is beyond the scope that those skilled in the art can be easily conceived and the reason is currently unclear.

In the electrode of the present invention, the active material layer before coated with the coating material is preferably a porous body having a porosity of 20% or more and 80% or less. When the porosity of the active material layer before coated with the coating material is small, the electrode has excellent electronic conductivity, but if it is less than 20%, the applied coating material is difficult to permeate and when the electrode comes into contact with moisture, it becomes difficult to trap hydrogen sulfide efficiently. In addition, the coating material tends to be deposited on the active material, which may reduce the ionic conductivity. On the other hand, when the porosity exceeds 80%, not only the volumetric energy density of the electrode is lowered, but also the electronic conductivity of the active material layer is deteriorated, so that the battery tends to have inferior output characteristics.

In the electrode of the present invention, by applying the coating material to the active material layer having voids, it is possible to manufacture an electrode in which a surface of the voids is coated with the coating material. Here, the void refers to a concept including all of: an independent space blocked from an outer surface, a space having a single path connected to the outer surface (so-called recess), and a space having multiple paths connected to the outer surface (so-called through hole). Here, the outer surface refers to the outermost surface of the active material layer, that is, the surface that comes into contact with a roll portion when the electrode is roll pressed in a controlled pressure.

The porosity of the active material layer can be calculated based on the following formula using the values of an apparent density d (g/cm$^3$) and a true density ρ (g/cm$^3$) of the active material layer. The apparent density d of the active material layer is a value obtained by dividing the mass (g) of the active material layer by the volume ($cm^3$) of the entire porous body including pores. The true density $\rho$ is a value obtained by dividing the mass (g) of the active material layer by the volume ($cm^3$) of the porous body excluding the pores.

Porosity (%) of active material layer=$(1-d/\rho) \times 100$

In the electrode after coated with the coating material, from the viewpoint of ability to efficiently trap hydrogen sulfide gas without deteriorating the electrode characteristics, the active material layer is preferably a porous body having a porosity of 5% or more and 70% or less, more preferably 20% or more and 65% or less, and still more preferably 25% or more and 60% or less.

The thickness of the coating material present on the surface of the voids is preferably 10 nm or more and 5000 nm or less. When the thickness is less than 10 nm, it is difficult to efficiently trap hydrogen sulfide when the electrode comes into contact with moisture. Further, when lithium polysulfide is generated, it may elute in an electrolytic solution solvent to reduce the electric capacity. On the other hand, when the thickness exceeds 5000 nm, not only the weight energy density of the electrode is lowered, but also the ionic conductivity of the active material layer becomes poor, and the battery tends to have inferior output characteristics. From these viewpoints, the thickness of 50 nm or more and 1000 nm or less is more preferable.

By setting the thickness of the coating material present on the surface of the voids within the above range, the increase of the apparent thickness of the electrode is 5000 nm even at the maximum, and if it is within the preferable range, just 1000 nm or less even at the maximum. Thus, the volumetric energy density of the battery does not significantly decrease.

Further, since the coating material is mainly composed of inorganic substances and is very thin, there is a high possibility of obtaining an electrode suppressing decrease in a thermal conductivity and excellent in heat dissipation.

Next, a non-aqueous electrolyte battery of the present invention (hereinafter referred to as "a battery of the present invention") will be described in detail. The battery of the present invention has a battery structure in which the electrode of the present invention is used as a positive electrode or a negative electrode, the positive electrode and the negative electrode are joined via a separator and sealed while being immersed in an electrolytic solution, for example. The battery structure is not limited to this, and can be applied to existing battery forms and structures such as laminating type batteries and winding type batteries.

When the electrode of the present invention is used for the positive electrode, the negative electrode is not particularly limited as long as it is a negative electrode used in non-aqueous electrolyte secondary batteries. That is, the active material used for the negative electrode is not particularly limited as long as it is a material capable of reversibly occluding/releasing one or more kinds of ions selected from the group of lithium ions, sodium ions, potassium ions, magnesium ions and calcium ions, or a material capable of being alloyed with lithium. For example, the material may has one or more kinds of element selected from the group consisting of Li, C, Mg, Al, Si, P, Ca, Sc, Ti, V, Cr, Mn, Fe, Co, Ni, Cu, Zn, Ga, Ge, Y, Zr, Nb, Mo, Pd, Ag, Cd, In, Sn, Sb, W, Pb, S and Bi, and may be any alloy, composite, oxide, chalcogenide or halide using these elements selected from the group of Li, Na, K, Mg and Ca.

From the viewpoint of the energy density of the negative electrode, the elements are preferably Li, Na, K, Mg, Ca, Al, Si, Zn, Ge, Ag, Sn, S and the like, and the alloy is preferably a combination such as: Si—Al, Al—Zn, Al—Li, Mg—Li, Si—Mg, Si—La, Al—Ge, Si—Ge, Si—Ag, Si—Sn, Si—Ti, Si—Y, Si—Cr, Si—Ni, Si—Zr, Si—V, Si—Nb, Si—Mo, Zn—Sn, Ge—Ag, Ge—Sn, Ge—Sb, Ag—Sn, Ag—Ge, Sn—Sb, S—Sn, S—Sb and the like. The oxide is preferably $SiO$, $Fe_2O_3$, $CuO$, $MnO_2$, $NiO$, $Li_4Ti_5O_{12}$, $H_2Ti_{12}O_{25}$ and the like. The alloy may be a whole solid solution alloy, a eutectic alloy, a hypoeutectic alloy, a hypereutectic alloy, or a peritectic alloy. Further, the surface of the active material particles may be coated with a material having excellent electronic conductivity or ceramics. Two or more kinds of materials can be used, which are capable of reversibly occluding/releasing one or more kinds of ion selected from the group of lithium ions, sodium ions, potassium ions, magnesium ions and calcium ions derived from these alloys.

However, if the active material of the negative electrode has a large irreversible capacity, the battery capacity will be extremely reduced, therefore, it is preferable to apply pre-doping before assembling the battery.

When the electrode of the present invention is used for the negative electrode, the positive electrode is not particularly limited as long as it is a positive electrode used in non-aqueous electrolyte secondary batteries. That is, it is possible to use an electrode including an active material which is, for example, alkali metal transition metal oxide-based, vanadium-based, solid solution-based (excess elements selected from the group of lithium, sodium, potassium, magnesium, and calcium), carbon-based, and organic substance-based, and other known electrodes.

Examples of the alkali metal transition metal oxide-based active material include $LiCoO_2$, $Li_{0.9}Na_{0.1}CoO_2$, $LiNiO_2$, $LiNi_{0.5}Co_{0.5}O_2$, $LiNi_{0.33}Mn_{0.33}Co_{0.33}O_2$, $LiNi_{0.5}Mn_{0.2}Co_{0.3}O_2$, $LiNi_{0.6}Mn_{0.2}Co_{0.2}O_2$, $LiNi_{0.8}Mn_{0.1}Co_{0.1}O_2$, $Li(Ni, Co, Al)O_2$, $LiMnO_2$, $LiMn_2O_4$, $LiFePO_4$, $LiFe_{0.5}Mn_{0.5}PO_4$, $LiMnPO_4$, $Li_2MnSiO_4$, $Li_2FeSiO_4$, $Li_2(Mn, Fe)SiO_4$, $Li_2CoSiO_4$, $Li_2MgSiO_4$, $Li_2CaSiO_4$, $Li_2ZnSiO_4$, $LiNb_2O_5$, $LiNbO_2$, $LiFeO_2$, $LiMgO_2$, $LiCaO_2$, $LiTiO_2$, $LiTiS_2$, $LiCrO_2$, $LiRuO_2$, $LiCuO_2$, $LiZnO_2$, $LiMoO_2$, $LiMoS_2$, $LiTaO_2$, $LiWO_2$.

Examples of the vanadium-based active material include $LiV_2O_5$, $LiVO_2$, $Li_3VO_4$, $Li_3V_2(PO_4)_3$.

Examples of the solid solution-based active material include $Li_2MnO_3$—$LiNiO_2$, $Li_2MnO_3$—$LiMnO_2$, $Li_2MnO_3$—$LiCoO_2$, $Li_2MnO_3$—$Li(Ni, Mn)O_2$, $Li_2MnO_3$—$Li(Ni, Co)O_2$, $Li_2MnO_3$—$Li(Mn, Co)O_2$, $Li_2MnO_3$—$Li(Ni, Mn, Co)O_2$.

Examples of the carbon-based active material include graphite, soft carbon, hard carbon, glassy carbon. Examples of the organic substance-based active material include rubeaic acid, tetracyanoquinodimethane, triquinoxalinylene, phenazinedioxide, trioxotriangulene, indigocarmine, nitronylnitroxide radical compounds, radialene-based compounds, aliphatic cyclic nitroxyl radicals, benzoquinones.

The alkali metal transition metal that is oxide-based, vanadium-based, solid solution-based (excess lithium-based), carbon-based, or organic substance-based positive electrode active material may be a material in which all or a part of the oxygen site is replaced with fluorine or a material in which a part of the lithium site is replaced with other alkali metal elements.

Further, the above-mentioned positive electrode active materials may be used alone, or in combination of two or more kinds thereof.

When a sulfur-based material is used as the positive electrode active material, or when neither the positive electrode nor the negative electrode contains a lithium compound as the active material, the battery capacity extremely reduces or the battery does not operate. Therefore, it is preferable to apply lithium doping treatment on one or both electrodes.

Regarding the lithium doping method, as described in Patent Literature 10 and Non-Patent Literature 4, an electrochemical method, an alkali metal pasting method, a mechanical method, and other known methods can be used.

Further, the electrolyte used in the battery of the present invention may be a liquid or solid that can transfer one or more kinds of ion selected from the group of lithium ion, sodium ion, potassium ion, magnesium ion, and calcium ion from the positive electrode to the negative electrode or from the negative electrode to the positive electrode. In particular, those capable of transferring lithium ions are preferable, and electrolytes used in known lithium ion batteries are applicable. Examples of the electrolytes include electrolytic solutions, gel electrolytes, solid electrolytes, ionic liquids and molten salts. Here, the electrolytic solution refers to a solution in which an electrolyte is dissolved in a solvent.

Since the electrolytic solution is required to contain one or more kinds of ion selected from the group of lithium ion, sodium ion, potassium ion, magnesium ion, and calcium ion, although not particularly limited as long as it is used in these ion batteries, it is composed of an electrolyte salt and an electrolyte solvent.

Since the electrolyte salt is required to contain one or more kinds of ion selected from the group of lithium ion, sodium ion, potassium ion, magnesium ion, and calcium ion, although not particularly limited as long as it is used in these ion batteries, the lithium salt is preferable. For this lithium salt, at least one kind selected from the group consisting of lithium hexafluorophosphate ($LiPF_6$), lithium perchlorate ($LiClO_4$), lithium tetrafluoroborate ($LiBF_4$), lithium trifluoromethanesulfonate ($LiCF_3SO_4$), lithium bistrifluoromethane sulfonylimide ($LiN(SO_2CF_3)_2$), lithium bispentafluoroethane sulfonylimide ($LiN(SO_2C_2F_5)_2$), lithium bisoxalate borate ($LiBC_4O_8$), etc. can be used. Of the above lithium salts, $LiPF_6$ is particularly preferable because it has a high electronegativity and is easily ionized. The electrolytic solution containing $LiPF_6$ has excellent charge and discharge cycle characteristics and can improve the charge and discharge capacity of secondary batteries.

The concentration of the electrolyte salt in the electrolytic solution is preferably in the range of 0.5 mol/L to 2.5 mol/L, more preferably in the range of 0.8 mol/L to 2.0 mol/L.

The solvent of the electrolyte is not particularly limited as long as it is used in one or more kinds of ion batteries selected from the group of lithium ion, sodium ion, potassium ion, magnesium ion, and calcium ion, but, for example, it is possible to use at least one kind selected from the group consisting of propylene carbonate (PC), ethylene carbonate (EC), dimethyl carbonate (DMC), diethyl carbonate (DEC), ethyl methyl carbonate (EMC), diphenyl carbonate, γ-butyrolactone (GBL), γ-valerolactone, methylformate (MF), 2-methyl tetrahydrofuran, 1,3-dioxolane, 4-methyl-1,3-dioxolane, dimethoxyethane (DME), 1,2-diethoxyethane, diethyl ether, sulfolane, tetrahydrofuran (THF), methyl sulfolane, nitromethane, N, N-dimethylformamide, dimethyl sulfoxide, vinylene carbonate (VC), vinylethylene carbonate (VEC), fluoroethylene carbonate (FEC), ethylenesulfite (ES). Of these, it is preferable to use at least one kind of PC, EC, DMC, DEC, EMC and the like. In particular, a mixture of a cyclic carbonate such as EC, PC, etc., and a chain carbonate such as DMC, DEC, EMC, etc. is preferable. A mixing ratio of the cyclic carbonate and the chain carbonate can be arbitrarily adjusted in the range of 10% by volume to 90% by volume for both the cyclic carbonate and the chain carbonate.

Of these, more preferably the solvent of the electrolyte contains VC, VEC, FEC, or ES. The content of VC, VEC, FEC, or ES is preferably 0.1 to 20% by mass, more preferably 0.2% by mass to 10% by mass, when the electrolytic solution (total amount of the electrolyte and solvent) is 100% by mass.

The concentration of this lithium salt in the electrolytic solution is preferably 0.5 to 2.5 mol/L, more preferably 0.8 to 2.0 mol/L.

The ionic liquid or molten salt is classified into a pyridine-based one, an alicyclic amine-based one, an aliphatic amine-based one, etc. depending on the type of cation (positive ion). By selecting the type of anion (negative ion) to be combined with these, various ionic liquids or molten salts can be synthesized. Examples of the cation include ammonium-based ions such as imidazolium salts and pyridinium salts, phosphonium-based ions, and inorganic-based ions, and for the anion, halogen-based ions such as bromide ions and trifurates, boron-based ions such as tetraphenylborate, phosphorus-based ions such as phosphatehexafluoro, etc. can be adopted.

The ionic liquids and molten salts can be obtained by a known synthetic method to construct by a combination of a cation such as imidazolium and an anion such as $Br^-$, $Cl^-$, $BF_4^-$, $PF_6^-$, $(CF_3SO_2)_2N^-$, $CF_3SO_3^-$, and $FeCl_4^-$. The ionic liquid or molten salt can function as an electrolytic solution without adding an electrolyte.

An assembled battery of one aspect according to the present invention is characterized by including the battery of the present invention.

An electric device of one aspect according to the present invention is characterized by including the battery or the assembled battery of the present invention.

Examples of the electric device include: irons, whisks, integrated personal computers, clothes dryers, medical equipment, earphones, interphones, wearable terminals, video equipment, air conditioners, air circulators, gardening machines, motorcycles, ovens, music players, music recorders, hot air heaters, toys, car components, flashlights, loudspeakers, car navigation systems, cassette stoves, household storage batteries, nursing machines, humidifiers, dryers, refueling machines, water dispensers, suction machines, safes, glue guns, mobile phones, mobile information devices, air purifiers, jackets with built-in electric fan, game machines, fluorescent lights, fluff removers, cordless phones, coffee makers, coffee warmers, ice scrapers, kotatsu, copy machines, haircut equipment, shavers, lawn mowers, automobiles, lighting equipment, dehumidifiers, sealers, shredders, automatic extracorporeal defibrillators, rice cookers, stereos, stoves, speakers, trouser presses, smartphones, rice mills, washing machines, toilet seats with cleaning function, sensors, fans, submarines, blowers, vacuum cleaners, flying cars, tablets, body fat meters, fishing tackles, digital cameras, TVs, TV receivers, video games, displays, disk changers, desktop computers, railroads, TVs, electric carpets, electric stands, electric stoves, electric pots, electric blankets, calculators, electric carts, electric wheelchairs, electric tools, electric cars, electric floats, electric toothbrushes, telephones, electric bicycles, electric shock insecticides, electromagnetic cookers, electronic notebooks, electronic musical instruments, electronic locks, electronic cards, microwave ovens, electronic mosquito repellents, electronic cigarettes, telephones, toasters, dryers, transceivers, watches, drones, food waste disposers, laptops, incandescent bulbs, soldering irons, panel heaters, halogen heaters, fermenters, baking machines, hybrid cars, personal computers, personal computer peripherals, varicans, panel heaters, semiconductors, video cameras, video decks, airplanes, emergency lights, emergency storage batteries, ships, beauty equipment, printers, copying machines, crushers, atomizers, facsimiles, forklifts, plug-in hybrid cars, projectors, hair dryers, hair irons, headphones, disaster prevention equipment, security equipment, home theaters, hot sand makers, hot plates, pumps, fragrance machines, massage machines, mixers, mills, movie players, monitors, mochi-making machines, water heaters, floor heating panels, radios, radio-cassette players, lanterns, radio controllers, laminators, remote controllers, ranges, water coolers, refrigerators, portable air coolers, cold air fans, cooling equipment, robots, word processors, GPS.

A method for manufacturing the non-aqueous electrolyte battery of the present invention includes the steps of: preparing the electrode including the above-mentioned current collector, the active material layer containing the sulfur-based material and the resin-based binder, and the coating material containing the silicate having the siloxane bond or the silica fine particle aggregation having the siloxane bond; forming the active material layer on the current collector; and applying the coating material to the active material layer.

DESCRIPTION OF EMBODIMENTS

Hereinafter, examples according to the present invention will be described in more detail, however, the present invention is not limited to these examples. In particular, in the examples, sodium silicate is described as an example of the coating material, but the present invention is not limited to this. Further, as an example of the sulfur-based material, sulfur-modified polyacrylonitrile is described, but the present invention is not limited to this. Further, the lithium ion battery is described as an example of the battery, but the present invention is not limited to this.

Synthesis of Sulfur-Modified Polyacrylonitrile (Sulfur-Modified Polyacrylonitrile-1)
Sulfur-modified polyacrylonitrile-1 was obtained by baking a mixed powder of polyacrylonitrile and elemental sulfur which were adjusted to have a mass ratio of 1:5, in a nitrogen gas atmosphere at 400° C. for 1 hour, then desulfurizing the baked powder under reduced pressure before classification. The obtained sulfur-modified polyacrylonitrile-1 has a median diameter ($D_{50}$) of 9 μm.
(Sulfur-Modified Polyacrylonitrile-2)
Sulfur-modified polyacrylonitrile-2 was obtained by pulverizing the sulfur-modified polyacrylonitrile-1 in an automatic mortar (NITTO KAGAKU CO., LTD.: ANM 1000) for 1 hour in the air. The obtained sulfur-modified polyacrylonitrile-2 has a median diameter ($D_{50}$) of 8 μm.
(Sulfur-Modified Polyacrylonitrile-3)
Sulfur-modified polyacrylonitrile-3 was obtained by placing the sulfur-modified polyacrylonitrile-1 and a zirconia ball having a diameter of 4 mm in a zirconia container in an argon gas environment, sealing the container, and performing mechanical milling by using a planetary ball mill (Fritsch: PULVERISETTE7) under a condition of 360 rpm (gravitational acceleration of about 10 G) for 1 hour. The obtained sulfur-modified polyacrylonitrile-3 has a median diameter ($D_{50}$) of 3 μm.

(Sulfur-Modified Polyacrylonitrile-4)
Sulfur-modified polyacrylonitrile-4 was obtained by placing the sulfur-modified polyacrylonitrile-1 and a zirconia ball having a diameter of 4 mm in a zirconia container in an argon gas environment, sealing the container, and performing mechanical milling by using a high speed planetary ball mill (Kurimoto, LTD.: Kurimoto High G) under a condition of an input frequency of 33.7 Hz (gravitational acceleration of about 50 G) for 1 hour. The obtained sulfur-modified polyacrylonitrile-4 has a median diameter ($D_{50}$) of 3 μm.

Preparation of Sulfur-Modified Polyacrylonitrile Positive Electrode (Comparative Example 1)
An electrode of Comparative Example 1 was prepared by applying a slurry consisting of sulfur-modified polyacrylonitrile-1, styrene-butadiene rubber (SBR), sodium carboxymethyl cellulose (CMC-Na), and carbon black to a carbon-coated aluminum foil (thickness of 20 μm) by using a doctor blade, drying the slurry at 80° C. in the air, then, applying a heat treatment under a condition of 150° C. in vacuum for 10 hours. The electrode capacitance density per one side was set to 2 mAh/cm$^2$, and the porosity of the electrode was 57%.
(Comparative Example 2)
An electrode of Comparative Example 2 was prepared by applying a slurry consisting of sulfur-modified polyacrylonitrile-2, an acrylic binder, and carbon black to a carbon-coated aluminum foil (thickness of 20 μm) by using a doctor blade, drying the slurry at 80° C. in the air, then, applying a heat treatment under a condition of 140° C., in vacuum for 10 hours. The electrode capacitance density per one side was set to 2.1 mAh/cm$^2$, and the porosity of the electrode was 56%.
(Comparative Example 3)
An electrode of Comparative Example 3 was the same as that of Comparative Example 2 except that sulfur-modified polyacrylonitrile-3 was used.
(Comparative Example 4)
An electrode of Comparative Example-4 was the same as that of Comparative Example 2 except that sulfur-modified polyacrylonitrile-4 was used.
(Working Example 1)
An electrode of Working Example 1 was prepared by applying the same slurry as in Comparative Example 1 to a carbon-coated aluminum foil (thickness of 20 μm) with a doctor blade, drying the slurry at 80° C. in the air, applying a sodium silicate aqueous solution to the active material layer of the electrode with a spray gun and drying at 80° C. in the air, and then applying a heat treatment under a condition of 150° C., in vacuum for 10 hours. The coating amount (solid content) of sodium silicate per unit area was set to 0.2 mg/cm$^2$. The electrode of Working Example 1 was thicker than that of Comparative Example 1 by about 300 nm.

To prepare the sodium silicate aqueous solution, water was added to the silicate of the general formula Na$_2$O·3SiO$_2$ so that a solid content was adjusted to 15% by mass, to which a nonionic surfactant (Octylphenol ethoxylate) was added so as to be 5000 ppm of the total. The capacity density per one side of the electrode was set to 2 mAh/cm$^2$.
(Working Example 2)
An electrode of Working Example 2 was prepared by applying the same slurry as in Comparative Example 2 to a carbon-coated aluminum foil (thickness of 20 μm) with a doctor blade, drying the slurry at 80° C. in the air, applying a sodium silicate aqueous solution to the active material layer of the electrode with a spray gun and drying at 80° C. in the air, and then applying a heat treatment under a condition of at 140° C. in vacuum for 10 hours.

The electrode of Working Example 2 was thicker than that of Comparative Example 2 by about 400 nm. The coating amount (solid content) of sodium silicate per unit area was set to 0.2 mg/cm$^2$.

Tb prepare the sodium silicate aqueous solution, water was added to the silicate of the general formula $Na_2O \cdot 2.9SiO_2$ so that a solid content was adjusted to 14.5% by mass, to which a nonionic surfactant (Octylphenol ethoxylate) was added so as to be 2000 ppm of the total. The capacity density per one side of the electrode was set to 2.1 mAh/cm$^2$.

(Working Example 3)

An electrode of Working Example 3 was the same as the electrode of Example 2 except that the same slurry as in Comparative Example 3 was used.

(Working Example 4)

An electrode of Working Example 4 was the same as the electrode of Example 2 except that the same slurry as in Comparative Example 4 was used.

Confirmation of Hydrogen Sulfide Gas Generation Due to Contact With Water

A lithiated test electrode of Comparative Example 1 and Working Example 1 was obtained by charging and discharging a battery for 5 cycles before discharging at 0.2 C-rate (constant current) until the battery voltage reached 1.0 V, and then dismantling the test battery. The battery was prepared to include: the electrode of Comparative Example 1 or Working Example 1 as a test electrode (φ11 mm), metallic lithium (φ14 mm) as a counter electrode, 1.0M LiPF$_6$/(EC:DEC=50:50 vol. %) as an electrolytic solution, and a glass non-woven fabric (ADVANTEC: GA-100) and a microporous polyolefin membrane (CELGARD, LLC.: Celgard #2325) superposed to each other as a separator. In the charging and discharging test, 0.2 C-rate charge and discharge (constant current) was repeated for 5 cycles under a condition of 30° C., a cutoff voltage of 1.0 to 3.0 V.

Each electrode after the charge and discharge for 5 cycles has a capacity per active material of 500 mAh/g or more, respectively, therefore, it was confirmed that the electrode was operating normally. The work after dismantling the test battery was performed in a dry environment with a temperature of 20° C., a dew point of −70° C. or lower.

A contact test with water was performed by putting the lithiated test electrode and ion-exchanged water (1.0 mL, 25° C.) in a glass container (AS ONE Corporation: vial No. 6) with a capacity of 30 mL, sealing the container without delay by fitting a stopper, and leaving the container for 5 minutes.

Measurement of the hydrogen sulfide concentration was performed by removing the stopper of the glass container after being left, and pressing a gas sensing portion of a hydrogen sulfide meter (NEW COSMOS ELECTRIC CO., LTD: XS-2200) against a mouth of the glass container while the hydrogen sulfide gas not leaking to the outside.

The hydrogen sulfide concentration generated was 3.4 ppm in Comparative Example 1 and 0.0 ppm in Working Example 1. Whereas hydrogen sulfide gas was not even detected in the electrode of Working Example 1, an odor peculiar to hydrogen sulfide gas was confirmed in the electrode of Comparative Example 1.

From the above results, it was clarified that by coated with silicate, even if the lithiated sulfur-modified polyacrylonitrile electrode comes into contact with water, hydrogen sulfide gas is not generated. It is considered that the coated silicate suppresses the contact between the lithiated sulfur-modified polyacrylonitrile and water, and the generated hydrogen sulfide gas is trapped in the silicate.

Battery Charging and Discharging Test

A test battery was prepared to include: each electrode in Comparative Examples 2 to 5 and Working Examples 2 to 5 as a test electrode (φ11 mm), metallic lithium (φ14 mm) as a counter electrode, 1.0M LiPF$_6$/(EC:DEC=50:50 vol. %) as an electrolytic solution, and a glass non-woven fabric (ADVANTEC: GA-100) and a microporous polyolefin membrane (CELGARD, LLC.: Celgard #2325) superposed to each other as a separator.

The charging and discharging test was performed by repeating 0.1 C-rate charge and discharge (constant current) for 3 cycles under a condition of 30° C., a cutoff voltage of 1.0 to 3.0 V, and then repeating 0.5 C-rate charge and discharge (constant current) for 50 cycles.

Table 1 shows the charging and discharging test results of each electrode (Working Examples 2 to 4 and Comparative Examples 2 to 4). As is clear from Table 1, it can be understood that Working Examples 2 to 4 provided with the coating material are improved in cycle characteristics as compared with Comparative Examples 2 to 4. The fine particles of sulfur-modified polyacrylonitrile, though depending on the conditions of the mechanical milling treatment, disintegrates due to pulverization or strain, and the sulfur component that is easily dissolved in the electrolytic solvent is exposed, which reduces the reversible electric capacity. It is, however, considered that to coat the electrode with the coating material narrows the area of the exposed portion and suppresses the elution of lithium polysulfide.

TABLE 1

| | Discharge capacity of active material (mAh/g) | | |
|---|---|---|---|
| Experimental Example | 1 cycle (0.1 C-rate) | 2 cycle (0.1 C-rate) | 50 cycle (0.5 C-rate) |
| Working Example 2 | 718.44 | 553.73 | 464.74 |
| Working Example 3 | 717.52 | 546.33 | 462.15 |
| Working Example 4 | 712.63 | 455.31 | 307.97 |
| Comparative Example 2 | 725.14 | 453.64 | 408.84 |
| Comparative Example 3 | 711.60 | 493.59 | 307.01 |
| Comparative Example 4 | 711.68 | 312.23 | 159.57 |

Figure 4:
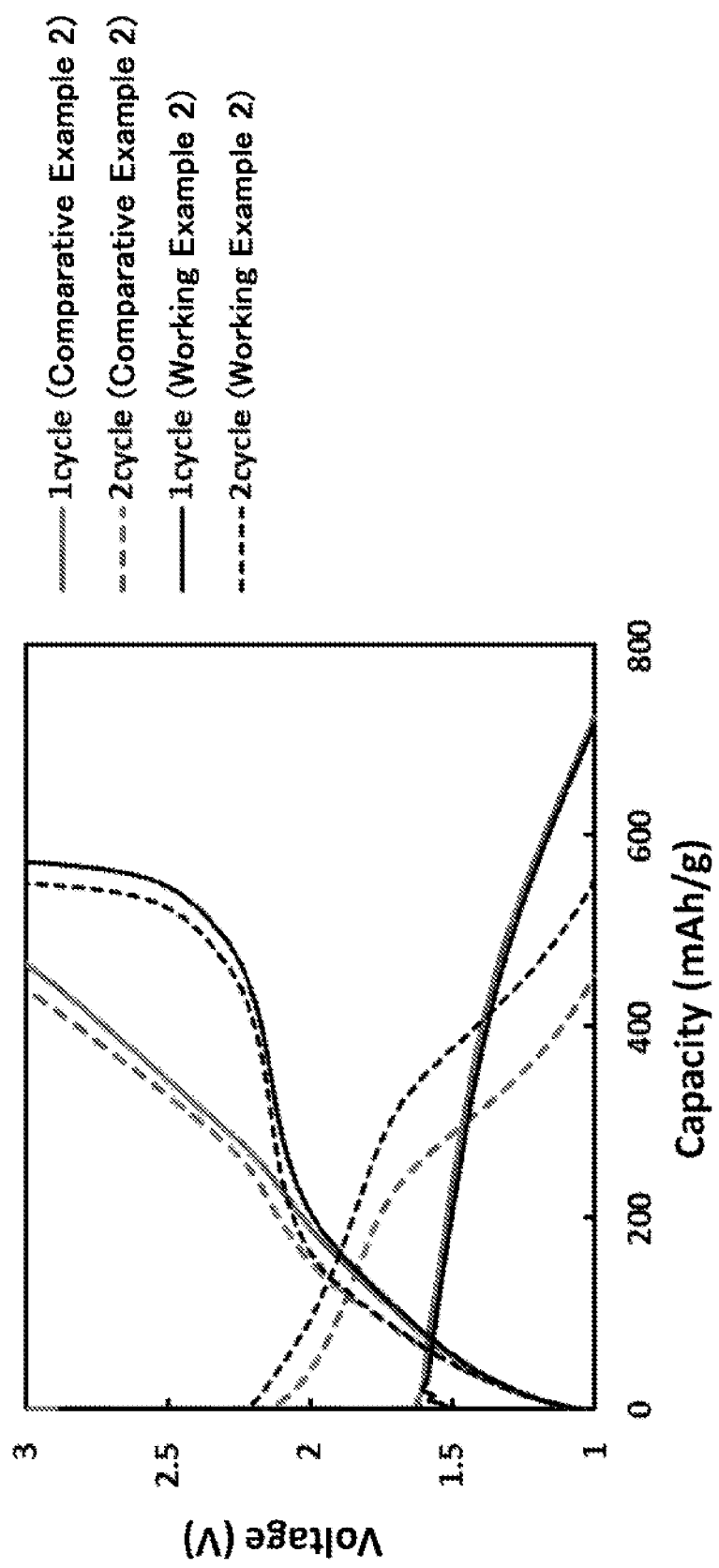
FIG. 4 is a diagram showing a comparison of the first charging and discharging curves between Comparative Example 2 and Working Example 2.
Figure 5:
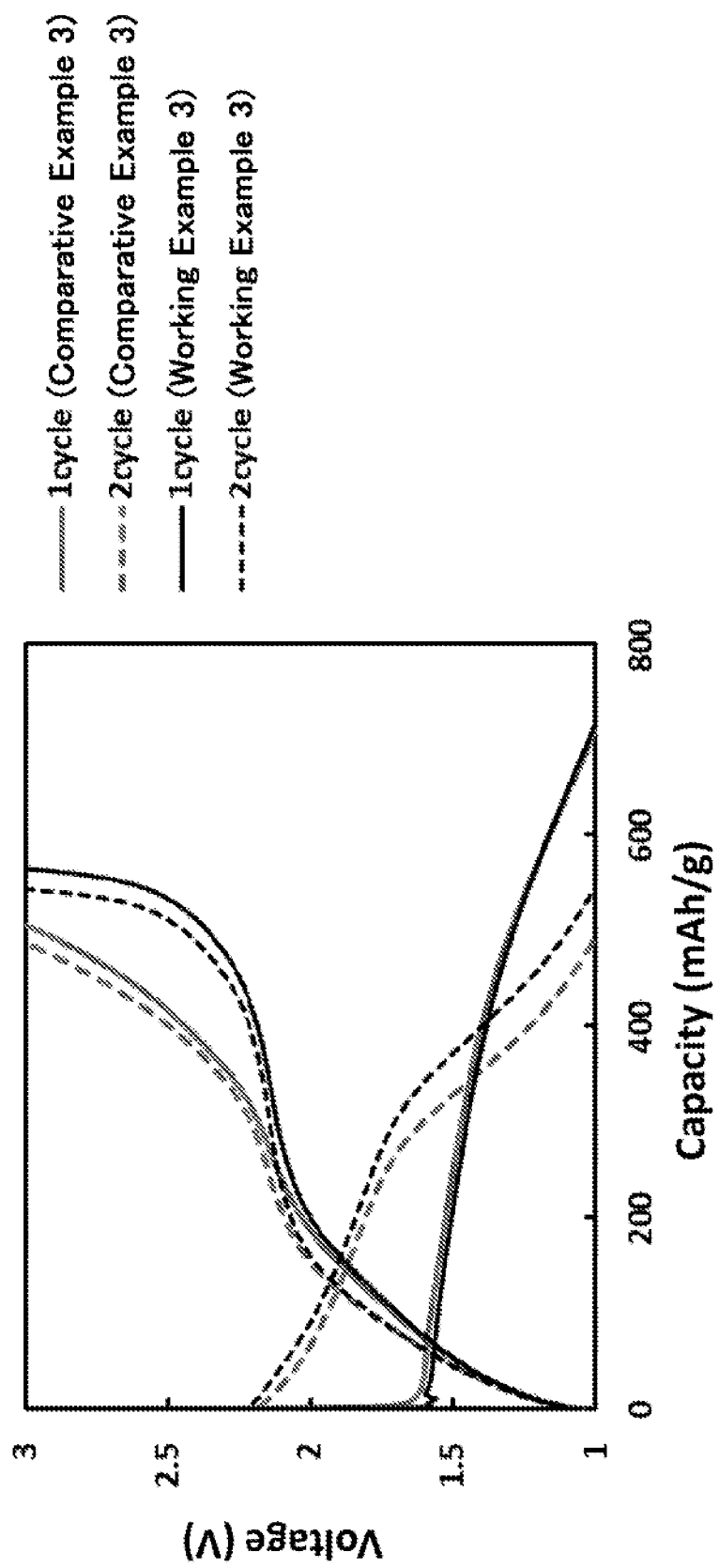
FIG. 5 is a diagram showing a comparison of the first charging and discharging curves between Comparative Example 3 and Working Example 3.
Figure 6:
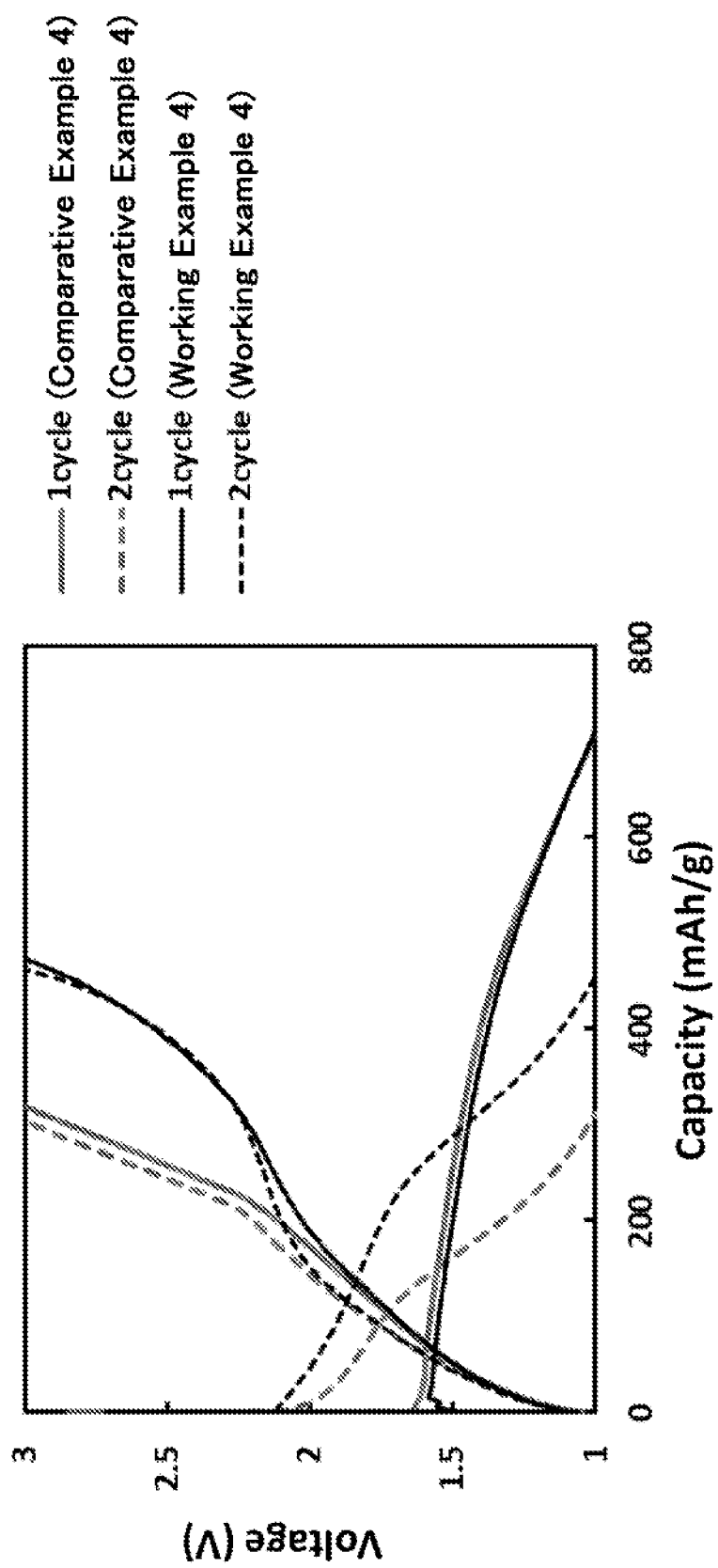
FIG. 6 is a diagram showing a comparison of the first charging and discharging curves between Comparative Example 4 and Working Example 4.

FIG. 4 shows a comparison of the initial charging and discharging curves between Comparative Example 2 and Working Example 2. FIG. 5 shows a comparison of the initial charging and discharging curves between Comparative Example 3 and Working Example 3. FIG. 6 shows a comparison of the initial charging and discharging curves between Comparative Example 4 and Working Example 4.

As is clear from FIGS. 4 to 6, in all the experimental examples of Working Examples 2 to 4 and Comparative Examples 2 to 4, the first lithiated reaction (the process of decreasing the voltage) has a similar voltage curve and almost the same electric capacity, but their behaviors differ greatly in the first delithiated reaction (the process of increasing the voltage) and the second and subsequent cycles.

Focusing on the voltage curve in the second cycle, the electrodes coated with the coating material (Working Examples 2 to 4) have a higher capacity than the electrodes without coated (Comparative Examples 2 to 4).

Further, the electrodes coated with the coating material (Working Examples 2 to 4) have smaller polarization of the charging and discharging curve than the electrodes without coated (Comparative Examples 2 to 4), and have excellent input/output characteristics. From the above results, it is clarified that to apply the coating material to the electrode, even if the sulfur-modified polyacrylonitrile is mechanically pulverized to fine particles, has the effect of suppressing decrease in the reversible electric capacity. It is also clarified that the electrode becomes excellent in input/output characteristics. It is considered that lithium polysulfide is suppressed from elution into the electrolytic solution by applying the coating material to the electrodes.

As described above, the preferred embodiments of the present invention have been described with reference to the drawings, but various additions, changes, or deletions can be made without departing from the spirit of the present invention. For example, various concentrations and proportions of the coating material and the composition of the active material layer are not limited to the above-described embodiments. Further, although the lithium ion battery has been described as an example in the above embodiments, the present invention can be applied not only to the lithium ion battery but also to other non-aqueous electrolyte secondary batteries such as a sodium ion battery and a potassium ion battery. Therefore, those are also included within the scope of the present invention.

The invention claimed is:

1. An electrode for non-aqueous electrolyte batteries, comprising a current collector, an active material layer, and a coating material;
    the coating material containing a silicate having a siloxane bond or a silica fine particle aggregate having a siloxane bond as a component;
    the silicate having the siloxane bond or the silica fine particle aggregate having the siloxane bond containing a silanol group and being present on at least a surface of the active material layer; and
    the active material layer containing a sulfur-based material and a resin-based binder.

2. The electrode for non-aqueous electrolyte batteries according to claim 1, wherein the sulfur-based material is sulfur-modified polyacrylonitrile.

3. The electrode for non-aqueous electrolyte batteries according to claim 1, wherein the coating material is present in the active material layer.

4. The electrode for non-aqueous electrolyte batteries according to claim 1, wherein the coating material suppresses the release of hydrogen sulfide gas generated in the active material layer to the outside.

5. The electrode for non-aqueous electrolyte batteries according to claim 4, wherein the coating material blocks an outgassing path of hydrogen sulfide gas generated in the active material layer to the outside.

6. The electrode for non-aqueous electrolyte batteries according to claim 1, wherein:
    the active material layer is a porous body having voids;
    the coating material does not fill all of the voids in the active material layer; and
    the voids are present in the active material layer.

7. The electrode for non-aqueous electrolyte batteries according to claim 1, wherein:
    the active material layer is a porous body with voids, having a porosity of 5% or more and 70% or less; and
    the coating material is coated on a surface of the voids.

8. The electrode for non-aqueous electrolyte batteries according to claim 7, wherein the coating material present on the surface of the voids has a thickness of 10 nm or more and 5000 nm or less.

9. The electrode for non-aqueous electrolyte batteries according to claim 1, wherein:
    the silicate has an amorphous structure represented by a general formula $A_2O \cdot nSiO_2$;
    A contains at least one kind of alkali metal element selected from Li, Na, K, Rb, and Cs; and
    n is 0.5 or more and 5.0 or less.

10. The electrode for non-aqueous electrolyte batteries according to claim 1, wherein aluminum or aluminum alloy is used for the current collector.

11. The electrode for non-aqueous electrolyte batteries according to claim 1, wherein the coating material further contains carbon.

12. The electrode for non-aqueous electrolyte batteries according to claim 1, wherein the resin-based binder contained in the active material layer is a water-based binder.

13. The electrode for non-aqueous electrolyte batteries according to claim 1, wherein, when the electrode comes into contact with moisture, the coating material suppresses contact between the sulfur-based material and moisture, and traps hydrogen sulfide gas generated in the active material layer.

14. The electrode for non-aqueous electrolyte batteries according to claim 1, wherein the sulfur-based material is a solid material that generates hydrogen sulfide gas by decomposition.

15. The electrode for non-aqueous electrolyte batteries according to claim 1, wherein the sulfur-based material has a particle size of 0.1 μm or more and 20 μm or less in median diameter ($D_{50}$).

16. An electrode for non-aqueous electrolyte batteries, comprising a current collector, an active material layer, and a coating material;
    the coating material containing a silicate having a siloxane bond or a silica fine particle aggregate having a siloxane bond as a component;
    the silicate having the siloxane bond or the silica fine particle aggregate having the siloxane bond containing a silanol group and being present in the active material layer; and
    the active material layer containing a sulfur-based material and a resin-based binder.

17. A non-aqueous electrolyte battery comprising the electrode according to claim 1, and an electrode containing an active material capable of alloying with lithium metal or an active material capable of occluding lithium ions.

18. A non-aqueous electrolyte battery comprising the electrode according to claim 1, and an electrode containing an active material capable of alloying with sodium metal or an active material capable of occluding sodium ions.

19. A non-aqueous electrolyte battery comprising the electrode according to claim 1, and an electrode containing an active material capable of alloying with potassium metal or an active material capable of occluding potassium ions.

20. A non-aqueous electrolyte battery comprising the electrode according to claim 1, and an electrode containing an active material capable of alloying with magnesium metal or an active material capable of occluding magnesium ions.

21. A non-aqueous electrolyte battery comprising the electrode according to claim 1, and an electrode containing an active material capable of alloying with calcium metal or an active material capable of occluding calcium ions.

22. A non-aqueous electrolyte battery provided with the electrode according to claim 1 as a negative electrode.

23. A non-aqueous electrolyte battery provided with the electrode according to claim 1 as a positive electrode.

24. The non-aqueous electrolyte battery according to claim 22, wherein at least one of the positive electrode and the negative electrode is lithium-doped.

25. The non-aqueous electrolyte battery according to claim 23, wherein at least one of the positive electrode and the negative electrode is lithium-doped.

26. An assembled battery provided with the non-aqueous electrolyte battery according to claim 17.

27. An electric device provided with the non-aqueous electrolyte battery according to claim 17.

28. A method of manufacturing an electrode for non-aqueous electrolyte batteries comprising steps of:
   preparing an electrode for non-aqueous electrolyte batteries including a current collector, an active material layer, and a coating material;
      the coating material containing a silicate having a siloxane bond or a silica fine particle aggregate having a siloxane bond as a component;
      the silicate having the siloxane bond or the silica fine particle aggregate having the siloxane bond containing a silanol group and being present at least on a surface of the active material layer;
      the active material layer containing a sulfur-based material and a resin-based binder; and
   applying the coating material to the active material layer.

* * * * *